US007619962B2

(12) United States Patent
Ohgo et al.

(10) Patent No.: US 7,619,962 B2
(45) Date of Patent: Nov. 17, 2009

(54) OPTICAL DISC AND METHOD OF PRODUCING THE SAME

(75) Inventors: Takashi Ohgo, Yokohama (JP); Itsuro Nakamura, Yokohama (JP); Takayuki Onizawa, Yokohama (JP); Naoyuki Nakagawa, Yokohama (JP); Kenji Oishi, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 293 days.

(21) Appl. No.: 11/710,755

(22) Filed: Feb. 26, 2007

(65) Prior Publication Data

US 2007/0147223 A1 Jun. 28, 2007

Related U.S. Application Data

(63) Continuation-in-part of application No. 11/300,989, filed on Dec. 15, 2005.

(30) Foreign Application Priority Data

Feb. 28, 2006 (JP) .............................. 2006-051758

(51) Int. Cl.
G11B 7/24 (2006.01)
(52) U.S. Cl. ...................... 369/275.4; 369/283; 369/286
(58) Field of Classification Search .................. 369/94, 369/272.1, 275.1–275.5, 283, 288; 428/64.4, 428/64.9
See application file for complete search history.

(56) References Cited

U.S. PATENT DOCUMENTS

| 5,126,996 A * | 6/1992 | Iida et al. ..................... 369/283 |
| 5,726,969 A * | 3/1998 | Moriya et al. ............. 369/275.1 |
| 6,027,594 A * | 2/2000 | Nishiuchi et al. ........... 156/182 |
| 6,679,430 B2 * | 1/2004 | Kato et al. ................... 235/494 |

(Continued)

FOREIGN PATENT DOCUMENTS

JP 09-115181 5/1997

(Continued)

OTHER PUBLICATIONS

Machine translation of JP 08-129780 into English, Hirose et al.*

(Continued)

*Primary Examiner*—Wayne R Young
*Assistant Examiner*—Brian Butcher
(74) *Attorney, Agent, or Firm*—Renner, Kenner, Greive, Bobak, Taylor & Weber

(57) ABSTRACT

An optical disc with a first recording layer has first data pits that include 14T data pits formed thereon in compliance with DVD-ROM specifications. A first reflective film is formed on the first recording layer, whereby the first reflective film has the relationship of $2.3 \leq Pw/Tf \leq 14$ between the 14T pit width and the first reflective film thickness. The disc also includes a second recording layer having a first surface and an opposed second surface, whereupon second data pits are formed on the first surface in compliance with BD-ROM specifications. A second semi-transparent reflective film is formed on the second recording layer, while a transparent layer having opposed third and fourth surfaces is formed over the second reflective film at the third surface, such that the fourth surface allows a laser beam to pass therethrough in reproduction from either the first or second data pits.

14 Claims, 28 Drawing Sheets

| DVD-L1 LAYER FILM THICKNESS Tf(nm) | DVD-L1 LAYER PIT WIDTH Pw (nm) | DVD-L1 LAYER REFLECTIVITY(%) | RESULTS |
|---|---|---|---|
| 10 | 300 | 5 | NG |
| 15 | 300 | 9 | NG |
| 20 | 300 | 12 | NG |
| 25 | 300 | 15 | NG |
| 30 | 300 | 18 | GOOD |
| 35 | 300 | 18 | GOOD |
| 40 | 300 | 19 | GOOD |
| 45 | 300 | 19 | GOOD |
| 50 | 300 | 20 | GOOD |
| 55 | 300 | 22 | GOOD |
| 60 | 300 | 23 | GOOD |
| 65 | 300 | 23 | GOOD |
| 70 | 300 | 24 | GOOD |
| 75 | 300 | 24 | GOOD |
| 80 | 300 | 25 | GOOD |
| 85 | 300 | 26 | GOOD |
| 90 | 300 | 25 | GOOD |
| 95 | 300 | 27 | GOOD |
| 100 | 300 | 27 | GOOD |
| 105 | 300 | 27 | GOOD |
| 110 | 300 | 28 | GOOD |
| 115 | 300 | 29 | GOOD |
| 120 | 300 | 30 | GOOD |
| 125 | 300 | 31 | NG |
| 130 | 300 | 32 | NG |

U.S. PATENT DOCUMENTS

2004/0213116 A1* 10/2004 Arai .................. 369/53.23
2006/0179448 A1* 8/2006 Smith et al. ............. 720/718

FOREIGN PATENT DOCUMENTS

| | | |
|---|---|---|
| JP | 10-003699 | 1/1998 |
| JP | 11-120617 | 4/1999 |
| JP | 11-283278 | 10/1999 |
| JP | 11-328735 | 11/1999 |
| JP | 2000-345073 | 12/2000 |
| JP | 2001-176129 | 6/2001 |
| JP | 2001-312841 | 11/2001 |
| JP | 2002-10072 | 4/2002 |
| JP | 2002-109784 | 4/2002 |
| JP | 2002-216391 | 8/2002 |
| JP | 2003-338085 | 11/2003 |
| JP | 2004-103183 | 4/2004 |
| WO | WO 03/041064 A1 | 5/2003 |
| WO | WO 2004/025630 A1 | 3/2004 |

OTHER PUBLICATIONS

Machine translation of JP 2003-109252 into English, Hayashibe et al.*
International Publication No. WO 00/65584.
Japanese Office Action w/English Translation (Nov. 26, 2008—4 pages).
Japanese Office Action w/English Translation (Mar. 3, 2009—4 pages).
Japanese Office Action w/English Translation (May 26, 2009—2 pages).

* cited by examiner

| REFLECTIVE-FILM(14a) THICKNESS(nm) | REFLECTIVITY(%) | | | BD JITTER (%) | RESULTS |
|---|---|---|---|---|---|
| | BD | DVD-L0 | DVD-L1 | | |
| 4 | 10 | 32 | 32 | 6.5 | NG |
| 5 | 12 | 30 | 30 | 6.2 | GOOD |
| 6 | 13 | 29 | 29 | 5.9 | GOOD |
| 7 | 14 | 28 | 29 | 5.7 | GOOD |
| 8 | 15 | 28 | 28 | 5.6 | GOOD |
| 9 | 16 | 27 | 28 | 5.5 | GOOD |
| 10 | 17 | 27 | 27 | 5.4 | GOOD |
| 11 | 17 | 26 | 26 | 5.4 | GOOD |
| 12 | 18 | 25 | 24 | 5.3 | GOOD |
| 13 | 19 | 24 | 23 | 5.3 | GOOD |
| 14 | 20 | 23 | 23 | 5.3 | GOOD |
| 15 | 22 | 22 | 22 | 5.5 | GOOD |
| 16 | 23 | 21 | 21 | 5.6 | GOOD |
| 17 | 24 | 21 | 20 | 5.8 | GOOD |
| 18 | 25 | 20 | 19 | 6.0 | GOOD |
| 19 | 26 | 19 | 18 | 6.1 | GOOD |
| 20 | 28 | 18 | 18 | 6.2 | GOOD |
| 21 | 28 | 17 | 16 | 6.4 | NG |
| 22 | 29 | 16 | 15 | 6.5 | NG |
| 23 | 30 | 15 | 14 | 6.7 | NG |

(PIT WITDH : 0.16 μm , PIT DEPTH : 75nm)

FIG. 6

| PIT WITDH PW (μm) | REFLECTIVITY(%) | | | BD JITTER (%) | RESULTS |
|---|---|---|---|---|---|
| | BD | DVD-L0 | DVD-L1 | | |
| 0.08 | 12.4 | 29.2 | 28.5 | 8.8 | NG |
| 0.1 | 12.4 | 29.4 | 28.6 | 7.0 | NG |
| 0.12 | 12.3 | 29.6 | 28.8 | 6.5 | GOOD |
| 0.14 | 12.2 | 29.7 | 28.9 | 6.2 | GOOD |
| 0.16 | 12.0 | 30 | 30 | 6.2 | GOOD |
| 0.18 | 12.2 | 30 | 29 | 5.8 | GOOD |
| 0.2 | 12 | 30.0 | 29.2 | 6.3 | GOOD |
| 0.22 | 11.2 | 30.3 | 29.3 | 7.0 | NG |

(BD REFLECTIVE - FILM THICKNESS : 5nm, PIT DEPTH : 75nm)

FIG. 7

| PIT WITDH PW (μm) | REFLECTIVITY(%) | | | BD JITTER (%) | RESULTS |
|---|---|---|---|---|---|
| | BD | DVD-L0 | DVD-L1 | | |
| 0.08 | 27.9 | 18.5 | 18.5 | 9.2 | NG |
| 0.1 | 28.0 | 18.4 | 18.4 | 7.2 | NG |
| 0.12 | 27.9 | 18.3 | 18.2 | 6.4 | GOOD |
| 0.14 | 27.5 | 18.1 | 18.2 | 6.2 | GOOD |
| 0.16 | 28.0 | 18.0 | 18.0 | 6.2 | GOOD |
| 0.18 | 27.8 | 18.2 | 18.1 | 6.2 | GOOD |
| 0.2 | 27.9 | 18.4 | 18.2 | 6.3 | GOOD |
| 0.22 | 27.8 | 18.5 | 19.2 | 6.9 | NG |

(BD REFLECTIVE - FILM THICKNESS : 20nm, PIT DEPTH : 75nm)

FIG. 8

| PIT DEPTH H (nm) | REFLECTIVITY(%) | | | BD JITTER (%) | RESULTS |
|---|---|---|---|---|---|
| | BD | DVD-L0 | DVD-L1 | | |
| 30 | 12.5 | 29.9 | 29.4 | 7.2 | NG |
| 35 | 12.5 | 29.8 | 29.3 | 6.9 | NG |
| 40 | 12.4 | 29.6 | 29.1 | 6.5 | GOOD |
| 45 | 12.3 | 29.7 | 28.9 | 6.7 | GOOD |
| 50 | 12.2 | 29.6 | 28.9 | 6.5 | GOOD |
| 55 | 12.2 | 29.4 | 28.7 | 6.4 | GOOD |
| 60 | 12.2 | 29.6 | 28.6 | 6.3 | GOOD |
| 65 | 12 | 29.8 | 28.6 | 6.3 | GOOD |
| 70 | 12 | 29.9 | 28.3 | 6.2 | GOOD |
| 75 | 12 | 30.0 | 29.2 | 6.2 | GOOD |
| 80 | 12.1 | 29.8 | 28.1 | 6.0 | GOOD |
| 85 | 12 | 29.6 | 28.0 | 6.1 | GOOD |
| 90 | 12.2 | 29.5 | 27.7 | 6.7 | NG |
| 95 | 12.1 | 29.7 | 27.6 | 7.2 | NG |

(BD REFLECTIVE - FILM THICKNESS: 5nm , PIT WIDTH : 0.2 μm)

| PIT DEPTH H (nm) | REFLECTIVITY(%) | | | BD JITTER (%) | RESULTS |
|---|---|---|---|---|---|
| | BD | DVD-L0 | DVD-L1 | | |
| 30 | 12.4 | 29.8 | 28.9 | 7.1 | NG |
| 35 | 12.5 | 29.6 | 29.0 | 6.9 | NG |
| 40 | 12.4 | 29.8 | 28.9 | 6.5 | GOOD |
| 45 | 12.4 | 29.7 | 29 | 6.4 | GOOD |
| 50 | 12.4 | 29.6 | 29 | 6.4 | GOOD |
| 55 | 12.3 | 29.6 | 28.8 | 6.4 | GOOD |
| 60 | 12.2 | 29.7 | 28.9 | 6.4 | GOOD |
| 65 | 12.2 | 29.5 | 28.9 | 6.3 | GOOD |
| 70 | 12.1 | 29.6 | 29.1 | 6.4 | GOOD |
| 75 | 12.3 | 29.6 | 28.8 | 6.5 | GOOD |
| 80 | 12.1 | 29.7 | 28.8 | 6.4 | GOOD |
| 85 | 12.0 | 29.6 | 28.9 | 6.4 | GOOD |
| 90 | 12.1 | 29.7 | 28.8 | 6.8 | NG |
| 95 | 12.1 | 29.8 | 28.8 | 7.8 | NG |

(BD REFLECTIVE - FILM THICKNESS: 5nm, PIT WIDTH : 0.12 μm)

FIG. 11

| PIT DEPTH H (nm) | REFLECTIVITY(%) | | | BD JITTER (%) | RESULTS |
|---|---|---|---|---|---|
| | BD | DVD-L0 | DVD-L1 | | |
| 30 | 27.8 | 18.3 | 18.5 | 7.5 | NG |
| 35 | 27.8 | 18.3 | 18.6 | 6.9 | NG |
| 40 | 28.0 | 18.2 | 18.6 | 6.4 | GOOD |
| 45 | 27.8 | 18.3 | 18.4 | 6.4 | GOOD |
| 50 | 27.8 | 18.3 | 18.5 | 6.3 | GOOD |
| 55 | 27.9 | 18.1 | 18.3 | 6.2 | GOOD |
| 60 | 28.0 | 18.2 | 18.2 | 6.4 | GOOD |
| 65 | 27.7 | 18.0 | 18.0 | 6.3 | GOOD |
| 70 | 27.6 | 18.1 | 18.2 | 6.3 | GOOD |
| 75 | 27.9 | 18.3 | 18.2 | 6.4 | GOOD |
| 80 | 28.0 | 18.0 | 18.2 | 6.4 | GOOD |
| 85 | 27.8 | 18.1 | 18.2 | 6.3 | GOOD |
| 90 | 27.9 | 18.0 | 18.3 | 7.1 | NG |
| 95 | 27.8 | 18.0 | 18.3 | 8.0 | NG |

(BD REFLECTIVE - FILM THICKNESS : 20nm , PIT WIDTH : 0.12 μm)

FIG. 12

| PIT DEPTH H (nm) | REFLECTIVITY(%) | | | BD JITTER (%) | RESULTS |
|---|---|---|---|---|---|
| | BD | DVD-L0 | DVD-L1 | | |
| 30 | 27.9 | 18.4 | 18.4 | 7.0 | NG |
| 35 | 28.0 | 18.2 | 18.3 | 6.6 | NG |
| 40 | 27.8 | 18.3 | 18.4 | 6.4 | GOOD |
| 45 | 27.9 | 18.3 | 18.4 | 6.3 | GOOD |
| 50 | 28.0 | 18.2 | 18.2 | 6.2 | GOOD |
| 55 | 27.7 | 18.2 | 18.3 | 6.3 | GOOD |
| 60 | 27.8 | 18.1 | 18.2 | 6.2 | GOOD |
| 65 | 27.8 | 18.3 | 18.2 | 6.3 | GOOD |
| 70 | 27.6 | 18.1 | 18.1 | 6.2 | GOOD |
| 75 | 27.9 | 18.4 | 18.2 | 6.3 | GOOD |
| 80 | 27.8 | 18.2 | 18.1 | 6.4 | GOOD |
| 85 | 27.9 | 18.1 | 18.2 | 6.3 | GOOD |
| 90 | 27.6 | 18.0 | 18.0 | 6.6 | NG |
| 95 | 27.7 | 18.1 | 18.1 | 7.5 | NG |

(BD REFLECTIVE - FILM THICKNESS : 20nm , PIT WIDTH : 0.2 μm)

FIG. 13

| DVD-L1 LAYER FILM THICKNESS Tf(nm) | DVD-L1 LAYER PIT WIDTH Pw (nm) | DVD-L1 LAYER REFLECTIVITY(%) | RESULTS |
|---|---|---|---|
| 10 | 300 | 5 | NG |
| 15 | 300 | 9 | NG |
| 20 | 300 | 12 | NG |
| 25 | 300 | 15 | NG |
| 30 | 300 | 18 | GOOD |
| 35 | 300 | 18 | GOOD |
| 40 | 300 | 19 | GOOD |
| 45 | 300 | 19 | GOOD |
| 50 | 300 | 20 | GOOD |
| 55 | 300 | 22 | GOOD |
| 60 | 300 | 23 | GOOD |
| 65 | 300 | 23 | GOOD |
| 70 | 300 | 24 | GOOD |
| 75 | 300 | 24 | GOOD |
| 80 | 300 | 25 | GOOD |
| 85 | 300 | 26 | GOOD |
| 90 | 300 | 25 | GOOD |
| 95 | 300 | 27 | GOOD |
| 100 | 300 | 27 | GOOD |
| 105 | 300 | 27 | GOOD |
| 110 | 300 | 28 | GOOD |
| 115 | 300 | 29 | GOOD |
| 120 | 300 | 30 | GOOD |
| 125 | 300 | 31 | NG |
| 130 | 300 | 32 | NG |

FIG. 14

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 30 | 180 | 6 | 6.0 | 20 | GOOD |
| 30 | 200 | 6.67 | 6.2 | 19 | GOOD |
| 30 | 220 | 7.33 | 6.5 | 20 | GOOD |
| 30 | 240 | 8 | 6.6 | 19 | GOOD |
| 30 | 260 | 8.67 | 6.8 | 18 | GOOD |
| 30 | 280 | 9.33 | 6.8 | 19 | GOOD |
| 30 | 300 | 10 | 6.8 | 19 | GOOD |
| 30 | 320 | 10.67 | 7.0 | 18 | GOOD |
| 30 | 340 | 11.33 | 7.1 | 18 | GOOD |
| 30 | 360 | 12 | 7.3 | 18 | GOOD |
| 30 | 380 | 12.67 | 7.3 | 18 | GOOD |
| 30 | 400 | 13.33 | 7.5 | 19 | GOOD |
| 30 | 420 | 14 | 7.8 | 18 | GOOD |
| 30 | 440 | 14.67 | 8.9 | 18 | NG |
| 30 | 460 | 15.33 | 9.7 | 19 | NG |
| 30 | 480 | 16 | 10.5 | 19 | NG |
| 30 | 500 | 16.67 | 11.8 | 18 | NG |

FIG. 15

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 120 | 180 | 1.5 | 14.0 | 30 | NG |
| 120 | 200 | 1.67 | 12.0 | 29 | NG |
| 120 | 220 | 1.83 | 11.3 | 30 | NG |
| 120 | 240 | 2 | 10.5 | 30 | NG |
| 120 | 260 | 2.17 | 9.5 | 29 | NG |
| 120 | 280 | 2.33 | 8.7 | 29 | NG |
| 120 | 300 | 2.5 | 7.4 | 28 | GOOD |
| 120 | 320 | 2.67 | 7.2 | 29 | GOOD |
| 120 | 340 | 2.83 | 7.0 | 29 | GOOD |
| 120 | 360 | 3 | 6.8 | 30 | GOOD |
| 120 | 380 | 3.17 | 6.6 | 30 | GOOD |
| 120 | 400 | 3.33 | 6.5 | 30 | GOOD |
| 120 | 420 | 3.5 | 6.2 | 29 | GOOD |
| 120 | 440 | 3.67 | 6.2 | 29 | GOOD |
| 120 | 460 | 3.83 | 6.2 | 29 | GOOD |
| 120 | 480 | 4 | 6.1 | 28 | GOOD |
| 120 | 500 | 4.17 | 6.1 | 29 | GOOD |

FIG. 16

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 50 | 180 | 3.6 | 6.6 | 20 | GOOD |
| 50 | 200 | 4 | 6.5 | 20 | GOOD |
| 50 | 220 | 4.4 | 6.3 | 20 | GOOD |
| 50 | 240 | 4.8 | 6.0 | 21 | GOOD |
| 50 | 260 | 5.2 | 5.9 | 21 | GOOD |
| 50 | 280 | 5.6 | 6.0 | 20 | GOOD |
| 50 | 300 | 6 | 6.0 | 20 | GOOD |
| 50 | 320 | 6.4 | 6.1 | 20 | GOOD |
| 50 | 340 | 6.8 | 6.2 | 21 | GOOD |
| 50 | 360 | 7.2 | 6.2 | 20 | GOOD |
| 50 | 380 | 7.6 | 6.2 | 20 | GOOD |
| 50 | 400 | 8 | 6.4 | 21 | GOOD |
| 50 | 420 | 8.4 | 6.5 | 20 | GOOD |
| 50 | 440 | 8.8 | 6.8 | 20 | GOOD |
| 50 | 460 | 9.2 | 6.9 | 20 | GOOD |
| 50 | 480 | 9.6 | 7.1 | 20 | GOOD |
| 50 | 500 | 10 | 7.2 | 20 | GOOD |

FIG. 17

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 75 | 180 | 2.4 | 8.5 | 24 | NG |
| 75 | 200 | 2.67 | 7.5 | 24 | GOOD |
| 75 | 220 | 2.93 | 6.9 | 25 | GOOD |
| 75 | 240 | 3.2 | 6.6 | 24 | GOOD |
| 75 | 260 | 3.47 | 6.4 | 24 | GOOD |
| 75 | 280 | 3.73 | 6.2 | 25 | GOOD |
| 75 | 300 | 4 | 6.3 | 25 | GOOD |
| 75 | 320 | 4.27 | 6.1 | 24 | GOOD |
| 75 | 340 | 4.53 | 6.0 | 24 | GOOD |
| 75 | 360 | 4.8 | 6.0 | 24 | GOOD |
| 75 | 380 | 5.07 | 5.9 | 25 | GOOD |
| 75 | 400 | 5.33 | 6.1 | 24 | GOOD |
| 75 | 420 | 5.6 | 6.1 | 24 | GOOD |
| 75 | 440 | 5.87 | 6.3 | 25 | GOOD |
| 75 | 460 | 6.13 | 6.3 | 24 | GOOD |
| 75 | 480 | 6.4 | 6.5 | 24 | GOOD |
| 75 | 500 | 6.67 | 6.8 | 24 | GOOD |

FIG. 18

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 100 | 180 | 1.8 | 11.5 | 28 | NG |
| 100 | 200 | 2 | 10.2 | 27 | NG |
| 100 | 220 | 2.2 | 9.1 | 28 | NG |
| 100 | 240 | 2.4 | 8.5 | 27 | NG |
| 100 | 260 | 2.6 | 7.6 | 27 | GOOD |
| 100 | 280 | 2.8 | 7.2 | 28 | GOOD |
| 100 | 300 | 3 | 7.1 | 28 | GOOD |
| 100 | 320 | 3.2 | 6.9 | 28 | GOOD |
| 100 | 340 | 3.4 | 6.9 | 27 | GOOD |
| 100 | 360 | 3.6 | 6.7 | 28 | GOOD |
| 100 | 380 | 3.8 | 6.8 | 28 | GOOD |
| 100 | 400 | 4 | 6.6 | 27 | GOOD |
| 100 | 420 | 4.2 | 6.6 | 28 | GOOD |
| 100 | 440 | 4.4 | 6.3 | 28 | GOOD |
| 100 | 460 | 4.6 | 6.3 | 28 | GOOD |
| 100 | 480 | 4.8 | 6.2 | 27 | GOOD |
| 100 | 500 | 5 | 6.3 | 28 | GOOD |

FIG. 19

| DVD-L1 LAYER FILM THICKNESS Tf(nm) | DVD-L1 LAYER PIT WIDTH Pw (nm) | DVD-L1 LAYER REFLECTIVITY(%) | RESULTS |
|---|---|---|---|
| 10 | 300 | 5 | NG |
| 15 | 300 | 9 | NG |
| 20 | 300 | 12 | NG |
| 25 | 300 | 15 | NG |
| 30 | 300 | 16 | NG |
| 35 | 300 | 18 | GOOD |
| 40 | 300 | 19 | GOOD |
| 45 | 300 | 19 | GOOD |
| 50 | 300 | 20 | GOOD |
| 55 | 300 | 22 | GOOD |
| 60 | 300 | 23 | GOOD |
| 65 | 300 | 23 | GOOD |
| 70 | 300 | 24 | GOOD |
| 75 | 300 | 23 | GOOD |
| 80 | 300 | 25 | GOOD |
| 85 | 300 | 26 | GOOD |
| 90 | 300 | 25 | GOOD |
| 95 | 300 | 27 | GOOD |
| 100 | 300 | 26 | GOOD |
| 105 | 300 | 27 | GOOD |
| 110 | 300 | 27 | GOOD |
| 115 | 300 | 28 | GOOD |
| 120 | 300 | 29 | GOOD |
| 125 | 300 | 29 | GOOD |
| 130 | 300 | 30 | GOOD |
| 135 | 300 | 31 | NG |
| 140 | 300 | 32 | NG |
| 150 | 300 | 33 | NG |

FIG. 21

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 35 | 180 | 5.14 | 7.1 | 18 | GOOD |
| 35 | 200 | 5.71 | 6.8 | 19 | GOOD |
| 35 | 220 | 6.29 | 6.7 | 19 | GOOD |
| 35 | 240 | 6.86 | 6.7 | 18 | GOOD |
| 35 | 260 | 7.43 | 6.5 | 18 | GOOD |
| 35 | 280 | 8 | 6.5 | 19 | GOOD |
| 35 | 300 | 8.57 | 6.3 | 19 | GOOD |
| 35 | 320 | 9.14 | 6.5 | 18 | GOOD |
| 35 | 340 | 9.71 | 6.6 | 18 | GOOD |
| 35 | 360 | 10.29 | 6.5 | 18 | GOOD |
| 35 | 380 | 10.86 | 6.9 | 18 | GOOD |
| 35 | 400 | 11.43 | 7.2 | 19 | GOOD |
| 35 | 420 | 12 | 7.4 | 18 | GOOD |
| 35 | 440 | 12.57 | 8.5 | 18 | NG |
| 35 | 460 | 13.14 | 9.3 | 19 | NG |
| 35 | 480 | 13.71 | 10.0 | 19 | NG |
| 35 | 500 | 14.29 | 11.5 | 18 | NG |

FIG. 22

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 130 | 180 | 1.38 | 15.5 | 30 | NG |
| 130 | 200 | 1.54 | 14.0 | 29 | NG |
| 130 | 220 | 1.69 | 12.8 | 30 | NG |
| 130 | 240 | 1.85 | 11.6 | 30 | NG |
| 130 | 260 | 2 | 10.3 | 29 | NG |
| 130 | 280 | 2.15 | 9.5 | 29 | NG |
| 130 | 300 | 2.31 | 8.7 | 28 | NG |
| 130 | 320 | 2.46 | 8.3 | 29 | NG |
| 130 | 340 | 2.61 | 7.6 | 29 | GOOD |
| 130 | 360 | 2.77 | 7.2 | 30 | GOOD |
| 130 | 380 | 2.92 | 6.7 | 30 | GOOD |
| 130 | 400 | 3.08 | 6.5 | 30 | GOOD |
| 130 | 420 | 3.23 | 6.5 | 29 | GOOD |
| 130 | 440 | 3.38 | 6.6 | 29 | GOOD |
| 130 | 460 | 3.54 | 6.5 | 29 | GOOD |
| 130 | 480 | 3.69 | 6.5 | 28 | GOOD |
| 130 | 500 | 3.85 | 6.6 | 29 | GOOD |

FIG. 23

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 55 | 180 | 3.27 | 7.0 | 22 | GOOD |
| 55 | 200 | 3.64 | 7.0 | 22 | GOOD |
| 55 | 220 | 4 | 6.9 | 23 | GOOD |
| 55 | 240 | 4.36 | 6.8 | 22 | GOOD |
| 55 | 260 | 4.73 | 6.7 | 23 | GOOD |
| 55 | 280 | 5.09 | 6.5 | 23 | GOOD |
| 55 | 300 | 5.45 | 6.5 | 22 | GOOD |
| 55 | 320 | 5.82 | 6.4 | 22 | GOOD |
| 55 | 340 | 6.18 | 6.4 | 23 | GOOD |
| 55 | 360 | 6.55 | 6.5 | 22 | GOOD |
| 55 | 380 | 6.91 | 6.6 | 22 | GOOD |
| 55 | 400 | 7.27 | 6.7 | 22 | GOOD |
| 55 | 420 | 7.64 | 6.6 | 23 | GOOD |
| 55 | 440 | 8 | 6.8 | 22 | GOOD |
| 55 | 460 | 8.36 | 6.9 | 22 | GOOD |
| 55 | 480 | 8.73 | 7.1 | 22 | GOOD |
| 55 | 500 | 9.09 | 7.2 | 23 | GOOD |

FIG. 24

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 80 | 180 | 2.25 | 9.8 | 25 | NG |
| 80 | 200 | 2.5 | 8.5 | 26 | NG |
| 80 | 220 | 2.75 | 7.5 | 25 | GOOD |
| 80 | 240 | 3 | 7.2 | 24 | GOOD |
| 80 | 260 | 3.25 | 6.8 | 25 | GOOD |
| 80 | 280 | 3.5 | 6.6 | 25 | GOOD |
| 80 | 300 | 3.75 | 6.6 | 25 | GOOD |
| 80 | 320 | 4 | 6.6 | 25 | GOOD |
| 80 | 340 | 4.25 | 6.5 | 26 | GOOD |
| 80 | 360 | 4.5 | 6.5 | 25 | GOOD |
| 80 | 380 | 4.75 | 6.5 | 25 | GOOD |
| 80 | 400 | 5 | 6.6 | 26 | GOOD |
| 80 | 420 | 5.25 | 6.6 | 26 | GOOD |
| 80 | 440 | 5.5 | 6.7 | 25 | GOOD |
| 80 | 460 | 5.75 | 6.7 | 25 | GOOD |
| 80 | 480 | 6 | 6.7 | 26 | GOOD |
| 80 | 500 | 6.25 | 6.9 | 25 | GOOD |

FIG. 25

| DVD-L1 LAYER FILM THICKNESS Tf(nm) | DVD-L1 LAYER PIT WIDTH Pw(nm) | Pw/Tf | DVD-L1 LAYER JITTER (%) | DVD-L1 LAYER REFLECTIVITY (%) | RESULTS |
|---|---|---|---|---|---|
| 110 | 180 | 1.64 | 14.8 | 28 | NG |
| 110 | 200 | 1.82 | 13.2 | 27 | NG |
| 110 | 220 | 2 | 12.0 | 28 | NG |
| 110 | 240 | 2.18 | 10.3 | 27 | NG |
| 110 | 260 | 2.36 | 9.5 | 27 | NG |
| 110 | 280 | 2.55 | 8.6 | 28 | NG |
| 110 | 300 | 2.73 | 7.4 | 28 | GOOD |
| 110 | 320 | 2.91 | 7.0 | 28 | GOOD |
| 110 | 340 | 3.09 | 7.0 | 27 | GOOD |
| 110 | 360 | 3.27 | 6.8 | 28 | GOOD |
| 110 | 380 | 3.45 | 6.6 | 28 | GOOD |
| 110 | 400 | 3.64 | 6.6 | 27 | GOOD |
| 110 | 420 | 3.82 | 6.6 | 28 | GOOD |
| 110 | 440 | 4 | 6.5 | 28 | GOOD |
| 110 | 460 | 4.18 | 6.7 | 28 | GOOD |
| 110 | 480 | 4.36 | 6.7 | 27 | GOOD |
| 110 | 500 | 4.55 | 6.8 | 28 | GOOD |

FIG. 26

| DVD LAYER FILM THICKNESS Tf(nm) | DVD LAYER PIT WIDTH Pw(nm) | DVD LAYER REFLECTIVITY(%) | RESULTS |
|---|---|---|---|
| 10 | 300 | 9 | NG |
| 15 | 300 | 18 | NG |
| 20 | 300 | 27 | NG |
| 25 | 300 | 33 | NG |
| 30 | 300 | 37 | NG |
| 35 | 300 | 45 | GOOD |
| 40 | 300 | 48 | GOOD |
| 45 | 300 | 50 | GOOD |
| 50 | 300 | 51 | GOOD |
| 55 | 300 | 54 | GOOD |
| 60 | 300 | 57 | GOOD |
| 65 | 300 | 60 | GOOD |
| 70 | 300 | 63 | GOOD |
| 75 | 300 | 65 | GOOD |
| 80 | 300 | 67 | GOOD |
| 85 | 300 | 69 | GOOD |
| 90 | 300 | 71 | GOOD |
| 95 | 300 | 73 | GOOD |
| 100 | 300 | 75 | GOOD |
| 105 | 300 | 77 | GOOD |
| 110 | 300 | 79 | GOOD |
| 115 | 300 | 80 | GOOD |
| 120 | 300 | 81 | GOOD |
| 125 | 300 | 82 | GOOD |
| 130 | 300 | 83 | GOOD |
| 135 | 300 | 84 | GOOD |
| 140 | 300 | 85 | GOOD |
| 145 | 300 | 86 | NG |
| 150 | 300 | 87 | NG |

FIG. 27

| DVD LAYER FILM THICKNESS Tf(nm) | DVD LAYER PIT WIDTH Pw(nm) | Pw/Tf | DVD LAYER JITTER (%) | DVD LAYER REFLECTIVITY (%) | RESULTS |
|---|---|---|---|---|---|
| 35 | 180 | 5.14 | 6.5 | 45 | GOOD |
| 35 | 200 | 5.71 | 6.5 | 45 | GOOD |
| 35 | 220 | 5.5 | 6.5 | 45 | GOOD |
| 35 | 240 | 6.29 | 6.4 | 46 | GOOD |
| 35 | 260 | 7.43 | 6.3 | 45 | GOOD |
| 35 | 280 | 8 | 6.3 | 46 | GOOD |
| 35 | 300 | 8.57 | 6.1 | 45 | GOOD |
| 35 | 320 | 9.14 | 6.0 | 46 | GOOD |
| 35 | 340 | 9.71 | 6.0 | 47 | GOOD |
| 35 | 360 | 10.29 | 6.2 | 46 | GOOD |
| 35 | 380 | 10.86 | 6.5 | 45 | GOOD |
| 35 | 400 | 11.43 | 6.8 | 47 | GOOD |
| 35 | 420 | 12 | 7.2 | 46 | GOOD |
| 35 | 440 | 12.57 | 7.5 | 46 | GOOD |
| 35 | 460 | 13.14 | 7.8 | 46 | GOOD |
| 35 | 480 | 13.71 | 8.2 | 46 | NG |
| 35 | 500 | 14.29 | 8.9 | 46 | NG |

FIG. 28

| DVD LAYER FILM THICKNESS Tf(nm) | DVD LAYER PIT WIDTH Pw(nm) | Pw/Tf | DVD LAYER JITTER (%) | DVD LAYER REFLECTIVITY (%) | RESULTS |
|---|---|---|---|---|---|
| 140 | 180 | 1.29 | 15.8 | 85 | NG |
| 140 | 200 | 1.43 | 14.0 | 85 | NG |
| 140 | 220 | 1.57 | 12.0 | 85 | NG |
| 140 | 240 | 1.71 | 10.9 | 86 | NG |
| 140 | 260 | 1.86 | 9.5 | 84 | NG |
| 140 | 280 | 2 | 8.9 | 84 | NG |
| 140 | 300 | 2.14 | 8.5 | 85 | NG |
| 140 | 320 | 2.29 | 7.5 | 85 | GOOD |
| 140 | 340 | 2.43 | 7.2 | 85 | GOOD |
| 140 | 360 | 2.57 | 6.7 | 85 | GOOD |
| 140 | 380 | 2.71 | 6.5 | 86 | GOOD |
| 140 | 400 | 2.86 | 6.5 | 86 | GOOD |
| 140 | 420 | 3 | 6.5 | 85 | GOOD |
| 140 | 440 | 3.14 | 6.6 | 85 | GOOD |
| 140 | 460 | 3.29 | 6.6 | 85 | GOOD |
| 140 | 480 | 3.43 | 6.7 | 85 | GOOD |
| 140 | 500 | 3.57 | 6.8 | 85 | GOOD |

FIG. 29

| DVD LAYER FILM THICKNESS Tf(nm) | DVD LAYER PIT WIDTH Pw(nm) | Pw/Tf | DVD LAYER JITTER (%) | DVD LAYER REFLECTIVITY (%) | RESULTS |
|---|---|---|---|---|---|
| 65 | 180 | 2.77 | 7.5 | 60 | GOOD |
| 65 | 200 | 3.08 | 7.2 | 61 | GOOD |
| 65 | 220 | 3.38 | 6.9 | 60 | GOOD |
| 65 | 240 | 3.69 | 6.8 | 59 | GOOD |
| 65 | 260 | 4 | 6.5 | 60 | GOOD |
| 65 | 280 | 4.31 | 6.4 | 60 | GOOD |
| 65 | 300 | 4.62 | 6.1 | 60 | GOOD |
| 65 | 320 | 4.92 | 6.2 | 61 | GOOD |
| 65 | 340 | 5.23 | 6.1 | 60 | GOOD |
| 65 | 360 | 5.54 | 6.0 | 60 | GOOD |
| 65 | 380 | 5.85 | 6.0 | 61 | GOOD |
| 65 | 400 | 6.15 | 6.2 | 60 | GOOD |
| 65 | 420 | 6.46 | 6.5 | 61 | GOOD |
| 65 | 440 | 6.77 | 6.5 | 61 | GOOD |
| 65 | 460 | 7.08 | 6.4 | 60 | GOOD |
| 65 | 480 | 7.38 | 6.8 | 61 | GOOD |
| 65 | 500 | 7.69 | 7.0 | 61 | GOOD |

FIG. 30

| DVD LAYER FILM THICKNESS Tf(nm) | DVD LAYER PIT WIDTH Pw(nm) | Pw/Tf | DVD LAYER JITTER (%) | DVD LAYER REFLECTIVITY (%) | RESULTS |
|---|---|---|---|---|---|
| 90 | 180 | 2 | 9.2 | 71 | NG |
| 90 | 200 | 2.22 | 8.4 | 70 | NG |
| 90 | 220 | 2.44 | 7.5 | 71 | GOOD |
| 90 | 240 | 2.67 | 7.3 | 70 | GOOD |
| 90 | 260 | 2.89 | 7.1 | 70 | GOOD |
| 90 | 280 | 3.11 | 6.9 | 71 | GOOD |
| 90 | 300 | 3.33 | 6.9 | 71 | GOOD |
| 90 | 320 | 3.56 | 6.8 | 72 | GOOD |
| 90 | 340 | 3.78 | 6.7 | 71 | GOOD |
| 90 | 360 | 4 | 6.6 | 71 | GOOD |
| 90 | 380 | 4.22 | 6.8 | 71 | GOOD |
| 90 | 400 | 4.44 | 6.4 | 70 | GOOD |
| 90 | 420 | 4.67 | 6.5 | 71 | GOOD |
| 90 | 440 | 4.89 | 6.2 | 71 | GOOD |
| 90 | 460 | 5.11 | 6.3 | 71 | GOOD |
| 90 | 480 | 5.33 | 6.0 | 71 | GOOD |
| 90 | 500 | 5.56 | 6.0 | 72 | GOOD |

FIG. 31

| DVD LAYER FILM THICKNESS Tf(nm) | DVD LAYER PIT WIDTH Pw(nm) | Pw/Tf | DVD LAYER JITTER (%) | DVD LAYER REFLECTIVITY (%) | RESULTS |
|---|---|---|---|---|---|
| 115 | 180 | 1.57 | 12.5 | 80 | NG |
| 115 | 200 | 1.74 | 11.0 | 80 | NG |
| 115 | 220 | 1.91 | 9.8 | 80 | NG |
| 115 | 240 | 2.09 | 8.5 | 80 | NG |
| 115 | 260 | 2.26 | 7.5 | 79 | GOOD |
| 115 | 280 | 2.43 | 7.1 | 79 | GOOD |
| 115 | 300 | 2.61 | 7.1 | 79 | GOOD |
| 115 | 320 | 2.78 | 7.0 | 80 | GOOD |
| 115 | 340 | 2.96 | 6.8 | 80 | GOOD |
| 115 | 360 | 3.13 | 6.8 | 80 | GOOD |
| 115 | 380 | 3.3 | 6.8 | 81 | GOOD |
| 115 | 400 | 3.48 | 6.6 | 81 | GOOD |
| 115 | 420 | 3.65 | 6.7 | 80 | GOOD |
| 115 | 440 | 3.83 | 6.6 | 80 | GOOD |
| 115 | 460 | 4 | 6.6 | 80 | GOOD |
| 115 | 480 | 4.17 | 6.6 | 80 | GOOD |
| 115 | 500 | 4.35 | 6.5 | 81 | GOOD |

FIG. 32

OPTICAL DISC AND METHOD OF PRODUCING THE SAME

CROSS-REFERENCE TO RELATED APPLICATIONS

This application is a continuation-in-part of application Ser. No. 11/300,989 filed on Dec. 15, 2005. Moreover, this application is based on and claims the benefit of priority from the prior Japanese Patent Application No. 2006-051758 filed on Feb. 28, 2006, the entire content of which is incorporated herein by reference.

BACKGROUND OF THE INVENTION

The present invention relates to an optical disc having two or more of recording layers and a method of producing such an optical disc. Particularly, this invention relates to an optical disc having several recording layers formed in compliance with different disc specifications and a method of producing such an optical disc.

Optical discs have a large storage capacity and are available to non-contact reproduction, and hence are widely used as read-only type discs, such as CD (Compact Disc), LD (Laser Disc), and DVD-ROM (DVD-Read Only Memory), write-once type discs, such as CD-R and DVD-R, and also rewritable-type discs, such as, DVD-RAM and DVD-RW.

One type of an optical disc in widespread use at present is a DVD in compliance with the DVD-Read Only Memory specifications (referred to as the DVD-ROM specifications, hereinafter). Another type of an optical disc which will probably be popular in the near future is a next-generation optical disc that is a BLU-RAY disc (BD) in compliance with the BLU-RAY Disc Read-Only Format specifications (referred to as the BD-ROM specifications, hereinafter). It is expected that DVD and BD will coexist for a certain period.

Under such expectation, disc manufacturers have to produce both DVD and BD for each type of video content, such as movies, which is inefficient in cost performance. Moreover, users may have trouble with a choice of whether to buy a DVD of a movie or a BD player and wait for a BD of that movie.

Optical discs that consist of a DVD and a BD, such as shown in FIGS. 1 to 3 could solve such a problem.

Shown in FIG. 1 is an optical disc having a 0.6 mm-thick substrate 37 and a 0.5 mm-thick substrate 39. Formed in order on the substrate 37 are a DVD-recording layer 36 and a reflective film 44. Data to be recorded on the recording layer 36 is in compliance with the DVD-ROM specifications. Formed in order on the substrate 39 are a BD-recording layer 38, a reflective film 45, and a 0.1 mm-thick transparent layer 40. Data to be recorded on the recording layer 38 is in compliance with the BD-ROM specifications. The substrates 37 and 39 are bonded to each other via an adhesive layer 43 so that the BD-recording layer 38 faces the reflective film 44.

In reproduction, a laser beam L may be focused onto both of the DVD- and BD-recording layers 36 and 38 via the transparent layer 40 and the reflective film 45 to pick up data from both recording layers. Or, a laser beam L may be focused onto the DVD-recording layer 36 via the substrate 37 to pick up data therefrom whereas another laser beam L may be focused onto the BD-recording layer 38 via the transparent layer 40 and the reflective film 45 to pick up data therefrom.

Shown in FIGS. 2 and 3 is an optical disc having a dual-layer DVD-recording layer structure of DVD-recording layers 36 and 41, and a single BD-recording layer 38. Formed on the DVD-recording layer 36 is a reflective film 44, like shown in FIG. 1. Formed on the DVD-recording layer 41 is a semi-transparent reflective film 42. The DVD-recording layer 41 may be formed on a substrate 37, as shown in FIG. 2 or on a substrate 39 having the BD-recording layer 38 formed thereon, as shown in FIG. 3.

In FIG. 2, laser beam L is emitted via a substrate 37 and a transparent layer 40, respectively, in reproduction. In FIG. 3, a laser beam L is emitted only via a transparent layer 40 in reproduction.

As shown in FIGS. 1 to 3, several types of optical discs having both DVD- and BD-recording layers are known.

Optical discs having a dual-layer DVD-recording layer structure, such as shown in FIGS. 2 and 3, are preferable because most DVDs on the market at present are dual-layer discs having two recording layers for larger storage capacity.

However, optical discs, such as shown in FIG. 2, require laser beams to be emitted to both sides in reproduction. There is thus no space for labels on the disc surfaces, which causes difficulty in determining which is the DVD or BD surface. Thus, the optical discs become less attractive.

Therefore, ideally, the most preferable among the optical discs shown in FIGS. 1 to 3 is the one shown in FIG. 3 which has a dual-layer DVD-recording layer structure and is available to exposure to a laser beam on one side in reproduction from both DVD- and BD-recording layers.

Optical discs, such as shown in FIG. 3, however, have to be produced to meet both DVD- and BD-ROM specifications for reproduction of DVD-quality videos by DVD players and also BD-quality (hi-vision level) videos by BD players.

In reproduction from the DVD-recording layer 36, a laser beam L emitted via the transparent layer 40 must pass through a BD-layer structure of the BD-recording layer 38, the reflective film 45, and the transparent layer 40 formed on the substrate 39.

It is, however, very difficult to achieve reflectivity within both DVD- and BD-ROM specifications.

For example, a higher reflectivity for the reflective film 45 of the BD-layer structure causes a lower reflectivity on both DVD-recording layers 36 and 41, thus lower video quality in reproduction. In contrast, a lower reflectivity for the reflective film 45 for higher reproduction performance from the DVD-recording layers 36 and 41 causes difficulty in reproduction from the BD-recording layer 38.

Moreover, the size of pits formed on the BD-recording layer 38 varies depending on the thickness of the reflective film 45 in the BD-layer structure. Variation in pit size further causes variation in signal quality, such as jitter.

In other words, there is an optimum thickness Tf that gives higher signal quality and another optimum thickness for higher reflectivity within the specifications for the reflective film 45 in the BD-layer structure.

WO00/65584 teaches the thickness range from 8 to 20 nm for such a reflective film in a BD-layer structure with one beam incidence surface in reproduction. This is an optimum thickness range for the reflective film in a BD-layer structure having a single recording layer, with no DVD-layer structure. Thus, there is no discussion on reflectivity for DVD-recording layers.

As discussed above, there is one requirement for an optical disc having at least two DVD-recording layers and one BD-recording layer. It is about the reflective film formed between the BD-recording layer and the transparent layer via which a laser beam is incident in reproduction. In detail, this particular reflective film must meet both DVD- and BD-ROM specifications for its reflectivity.

SUMMARY OF THE INVENTION

A purpose of the present invention is to provide an optical disc having two or more of DVD-recording layers and a single BD-recording layer that exhibits reflectivity within both DVD- and BD-ROM specifications for reproducing higher quality DVD- and BD-videos and also a method of producing such an optical disc.

The present invention provides an optical disc comprising: a first substrate having a thickness of 0.6 mm±30 μm, with a first recording layer formed thereon, the first recording layer having a string of first data pits formed concentrically or spirally in compliance with DVD-ROM specifications, the first data pits including 14T pits, T being a reference clock cycle; a first reflective film formed on the first recording layer, the first reflective film having a thickness in the range from 30 nm to 140 nm, the first substrate and the first reflective film having a relationship of $2.3 \leq Pw/Tf \leq 14$ wherein Pw is a pit width of each 14T pit at a middle section of the first substrate and Tf is a thickness of the first reflective film, the middle section being located between a top section and a bottom section of the first substrate in a thickness direction thereof, a distance from the top section to the middle section and another distance from the middle section to the bottom section being equal to each other; a second substrate having a thickness of 0.5 mm±30 μm and having a first surface and an opposing second surface, with a second recording layer formed on the first surface, the second recording layer having a string of second data pits formed concentrically or spirally in compliance with BD-ROM specifications; a second semi-transparent reflective film formed on the second recording layer, the first and second substrates being bonded to each other so that the first reflective film and the second surface of the second substrate face each other; and a transparent layer having a third surface and an opposing fourth surface, the transparent layer being formed over the second reflective film at the third surface, the fourth surface allowing a laser beam to pass therethrough in reproduction from at least either the first or the second data pits.

Moreover, the present invention provides a method of producing an optical disc comprising the steps of: forming a first recording layer on a first substrate having a thickness of 0.6 mm±30 μm, so that the first recording layer has a string of first data pits formed concentrically or spirally in compliance with DVD-ROM specifications, the first data pits including 14T pits, T being a reference clock cycle; forming a first reflective film on the first recording layer, so that the first reflective film has a thickness in the range from 30 nm to 140 nm and has a relationship of $2.3 \leq Pw/Tf \leq 14$ with the first reflective film, wherein Pw is a pit width of each 14T pit at a middle section of the first substrate and Tf is a thickness of the first reflective film, the middle section being located between a top section and a bottom section of the first substrate in a thickness direction thereof, a distance from the top section to the middle section and another distance from the middle section to the bottom section being equal to each other; forming a second recording layer on a second substrate having a thickness of 0.5 mm±30 μm and having a first surface and an opposing second surface, so that the second recording layer has a string of second data pits formed on the first surface concentrically or spirally in compliance with BD-ROM specifications; forming a second semi-transparent reflective film on the second recording layer; forming a transparent layer, having a third surface and an opposing fourth surface, over the second reflective film at the third surface, the fourth surface allowing a laser beam to pass therethrough in reproduction from at least either the first or the second data pits; and bonding the first and second substrates to each other so that the first reflective film and the second surface of the second substrate face each other.

BRIEF DESCRIPTION OF DRAWINGS

FIG. 6 is a view showing a table for use in evaluation of the thickness of a third semi-transparent reflective film of the optical disc according to the present invention;

FIG. 7 is a view showing a table for use in evaluation of the pit width of a third recording layer in the optical disc according to the present invention;

FIG. 8 is a view showing a table for use in evaluation of the pit width of the third recording layer in the optical disc according to the present invention;

FIG. 11 is a view showing a table for use in evaluation of the pit depth of the third recording layer in the optical disc according to the present invention;

FIG. 12 is a view showing a table for use in evaluation of the pit depth of the third recording layer in the optical disc according to the present invention;

FIG. 13 is a view showing a table for use in evaluation of the pit depth of the third recording layer in the optical disc according to the present invention;

FIG. 14 is a view showing a table for use in evaluation of the disc characteristics to the thickness of the first reflective film and the pit width of the first data pits in the optical disc according to the present invention;

FIG. 15 is a view showing a table for use in evaluation of reflectivity and jitter to a 30-nm-thick first reflective film in the optical disc according to the present invention;

FIG. 16 is a view showing a table for use in evaluation of reflectivity and jitter to a 120-nm-thick first reflective film in the optical disc according to the present invention;

FIG. 17 is a view showing a table for use in evaluation of reflectivity and jitter to a 50-nm-thick first reflective film in the optical disc according to the present invention;

FIG. 18 is a view showing a table for use in evaluation of reflectivity and jitter to a 75-nm-thick first reflective film in the optical disc according to the present invention;

FIG. 19 is a view showing a table for use in evaluation of reflectivity and jitter to a 100-nm-thick first reflective film in the optical disc according to the present invention;

FIG. 21 is a view showing a table for use in evaluation of the disc characteristics to the thickness of the first reflective film and the pit width of the first data pits in the optical disc according to the present invention;

FIG. 22 is a view showing a table for use in evaluation of reflectivity and jitter to a 35-nm-thick first reflective film in the optical disc according to the present invention;

FIG. 23 is a view showing a table for use in evaluation of reflectivity and jitter to a 130-nm-thick first reflective film in the optical disc according to the present invention;

FIG. 24 is a view showing a table for use in evaluation of reflectivity and jitter to a 55-nm-thick first reflective film in the optical disc according to the present invention;

FIG. 25 is a view showing a table for use in evaluation of reflectivity and jitter to an 80-nm-thick first reflective film in the optical disc according to the present invention;

FIG. 26 is a view showing a table for use in evaluation of reflectivity and jitter to a 110-nm-thick first reflective film in the optical disc according to the present invention;

FIG. 27 is a view showing a table for use in evaluation of the disc characteristics to the thickness of the first reflective film and the pit width of the first data pits in still another preferred embodiment of the optical disc according to the present invention;

FIG. 28 is a view showing a table for use in evaluation of reflectivity and jitter to a 35-nm-thick first reflective film in the optical disc according to the present invention;

FIG. 29 is a view showing a table for use in evaluation of reflectivity and jitter to a 140-nm-thick first reflective film in the optical disc according to the present invention;

FIG. 30 is a view showing a table for use in evaluation of reflectivity and jitter to a 65-nm-thick first reflective film in the optical disc according to the present invention;

FIG. 31 is a view showing a table for use in evaluation of reflectivity and jitter to a 90-nm-thick first reflective film in the optical disc according to the present invention; and FIG. 32 is a view showing a table for use in evaluation of reflectivity and jitter to a 115-nm-thick first reflective film in the optical disc according to the present invention.

DETAILED DESCRIPTION OF PREFERRED EMBODIMENTS

Preferred embodiments of an optical disc and a production method for such an optical disc according to the present invention will be disclosed with reference to the attached drawings.

The same reference signs or numerals are given to the same or analogous elements throughout the figures. The figures are not drawn in scale and are exaggerated particularly in the thickness direction for easier understanding.

Figure 4:
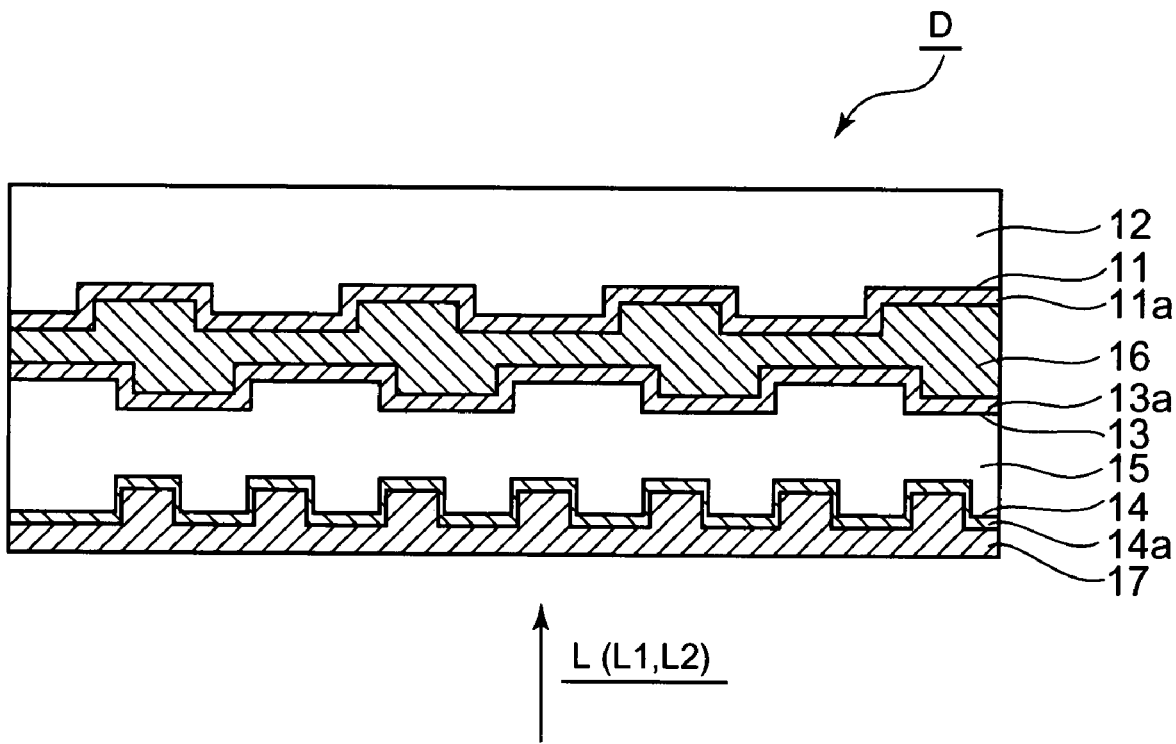
FIG. 4 is a sectional view showing a preferred embodiment of an optical disc according to the present invention.

A preferred embodiment of an optical disc according to the present invention will be disclosed with reference to FIG. 4.

As shown in FIG. 4, an optical disc D has a first substrate 12 and a second substrate 15. Formed in order on one surface of the first substrate 12 are a first recording layer 11 and a first reflective film 11a. The other surface of the first substrate 12 is for use in title labeling. Formed in order on one surface of the second substrate 15 are a second recording layer 13 and a second semi-transparent reflective film 13a. Formed in order on the other surface of the second substrate 15 are a third recording layer 14, a third semi-transparent reflective film 14a, and a transparent cover layer 17. The first and second substrates 12 and 15 are bonded to each other via an adhesive layer 16 so that the first and second reflective films 11a and 13a face each other.

Transmitted via the transparent cover layer 17 in reproduction are a first laser beam L1 for reproduction from the first and second recording layers 11 an 13 and also a second laser beam L2 for reproduction from the third recording layers 14. A wavelength of the first laser beam L1 is in the range from 630 to 650 nm. A wavelength of the second laser beam L2 is in the range from 360 to 440 nm. The first and second laser beams L1 and L2 are referred to as a laser beam L hereinafter when both are concerned.

The first substrate 12 has a thickness of 0.6 mm. A string of first data pits (a data pit pattern) is concentrically or spirally formed on the surface of the substrate 12, as the first recording layer 11, based on data to be recorded. The first data pits are formed in compliance with the DVD-ROM specifications. The first reflective film 11a is formed on the recording layer 11, as disclosed above.

The second substrate 15 has a thickness of 0.5 mm. A string of second data pits is concentrically or spirally formed on one of the surfaces of the substrate 15, as the second recording layer 13, based on data to be recorded. The second data pits are also formed in compliance with the DVD-ROM specifications. The second semi-transparent reflective film 13a is formed on the recording layer 13, as disclosed above.

Formed on the other surface of the second substrate 15 is a string of third data pits as the third recording layer 14. These pits are also concentrically or spirally formed based on data to be recorded. The third data pits are formed in compliance with the BD-ROM specifications. The third semi-transparent reflective film 14a is formed on the recording layer 14, as having a thickness in the range from 5 to 20 nm.

The first reflective film 11a and the second semi-transparent reflective film 13a are bonded to each other via the adhesive layer 16. The transparent cover layer 17 is formed on the third semi-transparent reflective film 14a, as having a thickness of 0.1 mm in compliance with the BD-ROM specifications.

These films and layers constitute the optical disc D, shown in FIG. 4, the preferred embodiment of the present invention.

In operation, the laser beam L (L1, L2) is emitted via the transparent cover layer 17, as shown in FIG. 4, in reproduction of data recorded in the first, the second or the third recording layer 11, 13 or 14.

In detail, the second laser beam L2 having a wavelength in the range from 360 to 440 nm is emitted to the third recording layer 14 to pick up data from the third data pits formed in compliance with the BD-ROM specifications.

The first laser beam L1 having a wavelength in the range from 630 to 650 nm is emitted to the first recording layer 11 or the second recording layer 13 to pick up data from the first or the second data pits formed in compliance with the DVD-ROM specifications.

The layer structure constituted by the first recording layer 11 and the first reflective film 11a is referred to as a DVD-L1 composite layer. The layer structure constituted by the second recording layer 13 and the second semi-transparent reflective film 13a is referred to as a DVD-L0 composite layer. The layer structure constituted by the third recording layer 14 and the third semi-transparent reflective film 14a is referred to as a BD composite layer.

Figure 5:
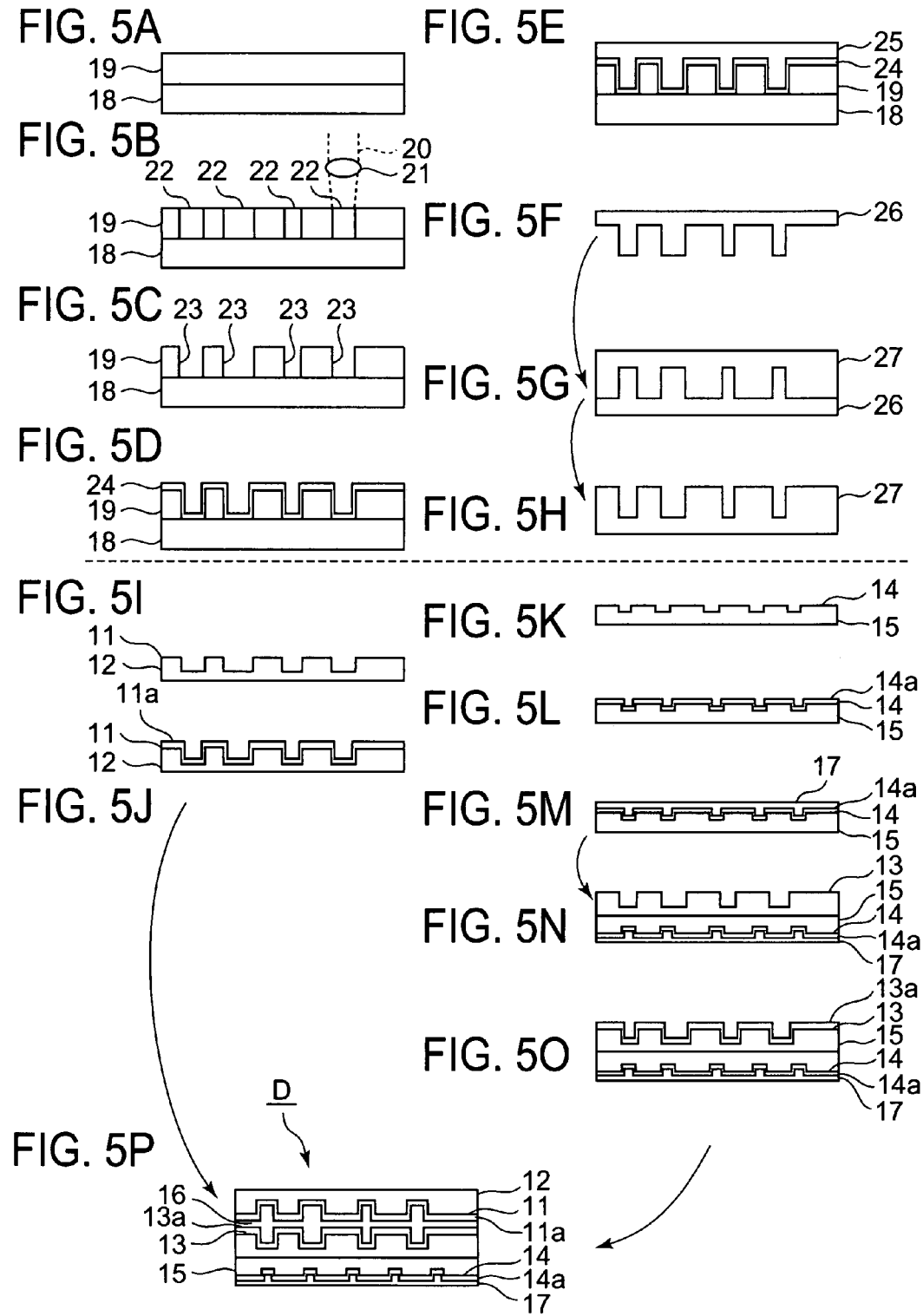
FIGS. 5A to 5P are sectional views illustrating a preferred embodiment of a method of producing the optical disc according to the present invention.

Disclosed next with reference to FIGS. 5A to 5P is a method of producing the optical disc D, the preferred embodiment of the present invention.

Disclosed first is a method of producing a DVD-stamper and a BD-stamper with reference to FIGS. 5A to 5H.

As shown in FIG. 5A, a photoresist layer 19 is formed by, for example, spin coating, on a glass plate 18 with the surface thereof being polished and cleaned, thus a blank master being produced.

Next, as shown in FIG. 5B, the glass plate 18 having the photoresist layer 19 thereon is exposed to a minute spot of a laser beam 20 converged by an objective lens 21.

The laser beam 20 is adjusted to have a specific wavelength so that pits are formed as having a size in compliance with the DVD- or BD-ROM specifications. For example, in production of a DVD-stamper, an ultraviolet laser is adjusted to have a wavelength in the range from 350 to 450 nm. Such an ultraviolet laser is an Ar laser, a Kr laser, an He—Cd laser, etc. Moreover, in production of a BD-stamper, a deep ultraviolet laser is adjusted to have a wavelength in the range from 200 to 300 nm.

The glass plate 18 is exposed to the laser beam 20 while it is rotating and moving at a constant speed. The laser beam 20 is turned on and off or continuously emitted to the plate 18.

Formed on the photoresist layer 19 in this process is a concentric or spiral latent image 22 that indicates each pit carrying a modulated signal in compliance with the DVD- or BD-ROM specifications.

Next, as shown in FIG. 5C, a glass plate having a string of pits 23 is produced in a developing process with an alkaline solution.

A conductive film 24, made of nickel, for example, is formed on the glass plate, as shown in FIG. 5D, by sputtering or electroless plating.

The glass plate is soaked into a nickel sulfamate, with the conductive film 24 and nickel as a cathode and an anode, respectively. A specific voltage is applied across the cathode and anode, thus nickel 25 being deposited on the glass plate, as shown in FIG. 5E.

The nickel 25 is removed from the glass plate, thus a metal master plate, or a stamper 26 is produced, as shown in FIG. 5F, which has a concave and convex pattern based on a data signal to be recorded.

The foregoing disclosed with reference to FIGS. 5A to 5F is a stamper production process.

The stamper 26 produced as above is used for mass production of optical discs in the following disc production process. In detail, the stamper 26 is subjected to post-treatments, such as, inner and outer diameter processing and rear-face polishing. It is then attached to a die and set in a molding machine.

As shown in FIG. 5G, a mold substrate 27 is produced with a synthetic resin that exhibits transparency, such as, acrylic and polycarbonate resin, using the stamper 26 as a die. This production process employs a compression molding, an injection molding or a photopolymer (2P) method. The thickness of the mold substrate 27 is adjusted in accordance with the type of optical discs.

The mold substrate 27 is then removed from the stamper 26, as shown in FIG. 5H.

In the 2P method, the mold substrate 27 is made of a photopolymerized polymer, such as a UV (ultraviolet)-cured resin. The stamper 26 used in the 2P method may be a metal stamper made of, for example, nickel, or a soft stamper (resin stamper) made of, for example, a transparent resin, like used for the mold substrate 27. When the metal stamper is used, the mold substrate 27 is exposed to UV rays so that the resin is cured. Thus, UV rays must be emitted to the substrate side with the resin applied thereon. In contrast, when the soft stamper is used, UV rays pass through the stamper and also the resin of the substrate 27 such that UV rays can be emitted to either the stamper side or the substrate side.

Such a soft stamper is preferably made of a resin similar to the mold substrate 27. Nevertheless, in this case, the mold substrate 27 and the soft stamper exhibit close adhesiveness. Thus, data pits, formed on the mold substrate 27 based on the concave and convex sections of the soft stamper, could be damaged when the substrate 27 is removed from the soft stamper, as shown in FIG. 5H.

It is therefore preferable to choose a highly releasable resin for the soft stamper or form a thin film of a highly releasable material on the stamper. A polyolefin resin exhibits high releasability. Moreover, such a thin film of high releasability may be formed with a polyolefin resin dissolved in an organic solvent with spin coating. Or, such a thin film of 1 to 100 nm in thickness may be formed with a metal, such as Si or Au, with a vacuum film forming technique, such as, sputtering.

The 2P method is explained briefly. A liquid UV-cured resin is applied onto the stamper 26 having the concave and convex sections formed thereon in compliance with the DVD- or BD-ROM specifications while the stamper 26 is rotating. A resin substrate having a flat surface is then attached on the stamper 26. A mechanical stress is applied to them to form a uniform adhesive layer therebetween, followed by exposure to UV rays to cure the UV-cured resin. The stamper 26 is then removed from the resin substrate. Formed on the resin substrate are a string of data pits that correspond to the concave and convex sections of the stamper 26. The resin substrate having the data pits is used as the mold substrate 27.

Another technique in the 2P method is application of a liquid UV-cured resin onto both of the stamper 26 and the resin substrate, followed by bonding with a mechanical stress, curing the UV-cured resin, and then removal of the stamper 26.

Still, another technique in the 2P method is application of a liquid UV-cured resin onto the resin substrate, followed by bonding with the stamper 26 with a mechanical stress, curing the UV-cured resin, and removal of the stamper 26, thus data pits being formed on the resin substrate.

Disclosed next with reference to FIGS. 5I and 5J is production of the first substrate 12 of the optical disc D, the preferred embodiment of the present invention.

The stamper 26 produced as disclosed above is used in injection molding with a resin, such as, polycarbonate, as a material of optical discs. The stamper 26 has a concave and convex pattern in compliance with the DVD-ROM specifications.

Formed in this process is the first substrate 12 having the first recording layer 11 with a string of the first data pits in compliance with the DVD-ROM specifications, as shown in FIG. 5I. The first data pits carry data recorded in compliance with the DVD-ROM specifications. The thickness of the substrate 12 in this embodiment is 0.6 mm (±30 µm) according to the DVD-ROM specifications.

Next, as shown in FIG. 5J, the first reflective film 11a is formed on the first recording layer 11, which is required in signal reproduction. The reflective film 11a is formed by a vacuum film forming technique, such as, sputtering or vacuum deposition, with a metal, such as Al, Ag or Au, or an alloy with one of these metals as a main ingredient. The main ingredient is defined as the most involved ingredient, in this embodiment.

As shown in FIG. 4, the first recording layer 11 is provided as the furthest recording layer among the three recording layers 11, 13 and 14 when viewed from the transparent cover layer 17 via which the laser beam L is incident in reproduction. The arrangements allow the first reflective film 11a to have a thickness, such as 100 nm or more, for the maximum reflectivity or the minimum transparency to the laser beam L.

Disclosed next with reference to FIGS. 5K and 5O is production of the second substrate 15 of the optical disc D, the preferred embodiment of the present invention.

There are two methods of producing the second substrate 15 that require a string of data pits on both sides.

A first method of producing the second substrate 15 is as follows: Prepared first is a stamper having a concave and convex pattern in compliance with the DVD-ROM specifications. Prepared next is another stamper having a concave and convex pattern in compliance with the BD-ROM specifications. These stampers can be produced as disclosed with reference to FIGS. 5A to 5F. The two stampers are used in injection molding, thus a resin substrate (the second substrate 15) is produced having a string of data pits on both sides.

A second method of producing the second substrate 15 is a combination of an injection molding and a photopolymer (2P) method. At first, the injection molding method is performed with a metal stamper to form one surface of the substrate 15 having a string of data pits. This is followed by the photopolymer method with a UV-cured resin to form a string of data pits on the other surface of the substrate 15.

The second substrate 15 produced by either the first or the second method has a thickness of 0.5 mm (±30 μm) in this embodiment. This thickness allows, in FIG. 4, the optical length from the transparent cover layer 17, via which the laser beam L is incident to each of the recording layers 11, 13 and 14, to meet the DVD- or BD-ROM specifications.

The embodiment employs the second method (the combination of the injection molding and 2P method) to produce the second substrate 15, as disclosed below.

The stamper 26 produced as disclosed with reference to FIGS. 5A to 5F is used in injection molding with a resin, such as, polycarbonate, as a material of optical discs. The stamper 26 in this process has a concave and convex pattern in compliance with the BD-ROM specifications.

Formed in this process is the second substrate 15 having the third recording layer 14 having a string of the third data pits in compliance with the BD-ROM specifications, as shown in FIG. 5K. The third data pits carry data recorded in compliance with the BD-ROM specifications.

Next, as shown in FIG. 5L, the third semi-transparent reflective film 14a is formed on the third recording layer 14. A suitable material for the reflective film 14a is a metal, such as Au, Ag or Al, or an alloy with one of these metals as a main ingredient. Another choice for the reflective film 14a is a dielectric that exhibits high refraction and transparency to the laser beam L in reproduction, such as ZnS, $TiO_2$, SiN, GeN, Si, SiC or SiH.

Next, as shown in FIG. 5M, the third reflective film 14a is covered with the transparent cover layer 17 in compliance with the BD-ROM specifications. The cover layer 17 has a thickness of 100 μm±3 μm in this embodiment. It is made of a film-type polycarbonate substrate with a UV-cured resin adhesive or a sheet-type adhesive, or of UV-cured resin only.

Accordingly, the second substrate 15 has the stack of the third recording layer 14, the semi-transparent reflective film 14a, and the transparent cover layer 17, all in compliance with the BD-ROM specifications, on one of its surfaces.

A UV-cured resin is then applied onto the other surface of the second substrate 15. The 2P method with a soft stamper is performed to this surface of the substrate 15, with UV rays on the stamper side. Produced in this method is the second recording layer 13 having a string of the second data pits in compliance with the DVD-ROM specifications (dual-layer type), as shown in FIG. 5N.

Next, as shown in FIG. 5O, the second semi-transparent reflective film 13a is formed on the second recording layer 13, as having a very thin film, preferably, in the range from 5 to 9 nm. The reflective film 13a is made of a metal, such as Au, Ag or Al, or an alloy with one of these metals as a main ingredient. Another choice for the reflective film 13a is a dielectric that exhibits high refraction and transparency to the laser beam L in reproduction, such as ZnS, $TiO_2$, SiN, GeN, Si, SiC or SiH, like the third semi-transparent reflective film 14a.

Finally, as shown in FIG. 5P, the first substrate 12 and the second substrate 15 are bonded to each other via the adhesive layer 16. They are bonded so that the first reflective film 11a and the second semi-transparent reflective film 13a face each other. In detail, for example, a liquid acryrate UV-cured resin is applied onto the first reflective film 11a of the first substrate 12. Then, the second substrate is placed on the first substrate 12 so that the first and second reflective films 11a and 13a face each other. The liquid acryrate UV-cured resin is adjusted to a specific thickness by spin coating. It is then cured by exposure to UV rays. The rays are emitted via the transparent cover layer 17 of the second substrate 15. This is because the rays cannot reach the UV-cured resin from the first substrate 12 side in this embodiment. The liquid acryrate UV-cured resin may be applied onto the second reflective film 13a of the second substrate 15.

Another bonding method employs a sheet-type adhesive. The adhesive is provided between the two substrates, followed by application of a mechanical stress to the substrates.

The adhesive layer 16 functions as a gap layer between the recording layers according to the DVD-ROM specifications. Thus, in either bonding method, the thickness of the adhesive layer 16 is adjusted to in the range from 35 to 75 μm, preferably, 40 to 70 μm.

This embodiment employs injection molding in production of the recording layer 14 in compliance with the BD-ROM specifications and the 2P method in production of the recording layer 13 in compliance with the DVD-ROM specifications on both sides of the substrate 15.

However, the present invention is not limited to such methods. For example, the 2P method with a soft stamper can be employed in production of the recording layer 14 in compliance with the BD-ROM specifications. And injection molding can be employed in production of the recording layer 13 in compliance with the DVD-ROM specifications. Moreover, injection molding can be employed in production of both the recording layers 13 and 14 on both sides of the substrate 15.

Whichever method is employed in production of the recording layers 13 and 14 on the second substrate 15, the following formation of the reflective films, bonding with the first substrate 12, and formation of the transparent cover layer 17 may not be limited to the order disclosed above, or may be implemented in any order.

The third semi-transparent reflective film 14a of the optical disc D in this embodiment reflects the second laser beam L2 but allows the first laser beam L1 to pass therethrough.

The second laser beam L2 has a wavelength in compliance with the BD-ROM specifications whereas the first laser beam L1 has a wavelength in compliance with the DVD-ROM specifications, as discussed above.

Therefore, the third semi-transparent reflective film 14a in this embodiment has to satisfy both of the DVD- and BD-ROM specifications in refletivity.

The reflectivity ranges defined in the DVD- and BD-ROM specifications are: 18 to 30% in dual-layer DVD having two recording layers; 35 to 70% in single-layer BD having a single recording layer; and 12 to 28% in dual-layer BD having two recording layers.

The optical disc D in this embodiment has two recording layers and one recording layer in compliance with the DVDand BD-ROM specifications, respectively. Therefore, the optical disc D has to satisfy the specifications in reflectivity range at least for the dual-layer BD and also the dual-layer DVD, discussed above.

Moreover, the second semi-transparent reflective film 13a of the optical disc D in this embodiment reflects the first laser beam L1 having a wavelength in compliance with the DVD-ROM specifications. This occurs when the laser beam L1 is incident via the third semi-transparent reflective film 14a, in reproduction from the second recording layer 13. However, the reflective film 13a functions differently when the laser beam L1 is incident via the third semi-transparent reflective film 14a, in reproduction from the first recording layer 11. In detail, it allows this laser beam L1 and a reflected beam from the recording layer 11 to pass therethrough.

Therefore, the second semi-transparent reflective film 13a of the optical disc D in this embodiment has to be adjusted to exhibit a particular reflectivity required for reproducing data (signal) recorded in the second recording layer 13, but a particular transparency to allow a laser beam to pass therethrough in reproducing data (signal) recorded in the first recording layer 11.

The first reflective film 11a of the optical disc D in this embodiment reflects the first laser beam L1 in a specific reflectivity range when the beam L1 is incident via the second and third semi-transparent reflective films 13a and 14a.

It is thus expected that the thickness of the third semi-transparent reflective film 14a of the BD composite layer (defined as above with reference to FIG. 4) affects reproduction from the first, the second and the third recording layers 11, 13 and 14 (DVD- or BD-recording layers) in compliance with the DVD- or BD-ROM specifications.

The following is the discussion on an optimum thickness for the third semi-transparent reflective film 14a, that offers high reproduction performance from those DVD- and BD-recording layers, with reference to FIGS. 6 to 13.

Several sample optical discs were produced according to the embodiment of the present invention, with variation in thickness of the reflective film 14a, or pit width or depth of the recording layer 14, and evaluated for reflectivity and jitter (disc characteristics), as shown in FIGS. 6 to 8 and 10 to 13.

Several items in tables of FIGS. 6 to 8 and 10 to 13 are defined as follows:

In reflectivity, the items BD, DVD-L0, and DVD-L1 indicate the third semi-transparent reflective film 14a, the second semi-transparent reflective film 13a, and the first reflective film 11a, respectively, in the BD, the DVD-L0, and the DVD-L1 composite layer (defined as above with reference to FIG. 4), respectively.

In results, the item GOOD is given to the sample discs that exhibited reflectivities within the standard reflectivity range from 12 to 28% for the dual-layer BD and the standard reflectivity range from 18 to 30% for the dual-layer DVD, and also jitter at or below 6.5%, the standard maximum jitter level for the dual-layer BD, whereas the item NG (No Good) is given to the sample discs that exhibited reflectivities and/or litter that is out of the standard ranges. Jitter was measured using a limit equalizer.

The table in FIG. 6 teaches that the samples having the third semi-transparent reflective film 14a with the thickness in the range from 5 to 20 nm satisfy the standard reflectivity range requirements for the dual-layer BD and also the dual-layer DVD.

In other words, the third semi-transparent reflective film 14a reflects the second laser beam L2 whereas it allows the first laser beam L1 to pass therethrough when it has a thickness in the range from 5 to 20 nm. As defined above, the first and second laser beams L1 and L2 have a wavelength in compliance with the DVD- and BD-ROM specifications, respectively. A further preferable range for the thickness of the reflective film 14a is from 5 to 12 nm.

Discussed next with reference to FIGS. 7 and 8 are the disc characteristics in the sample optical discs having the third semi-transparent reflective film 14a with the thickness of 5 or 20 nm with variation in pit width Pw for the third recording layer 14 in the BD-composite layer. In the tables of FIGS. 7 and 8, the thickness of the film 14a was 5 and 20 nm, respectively, for all samples. The pit width Pw was a width of an 8T (reference clock cycle) pit which will be explained with reference to FIG. 9, for all samples in the two tables.

Figures 9, 10:
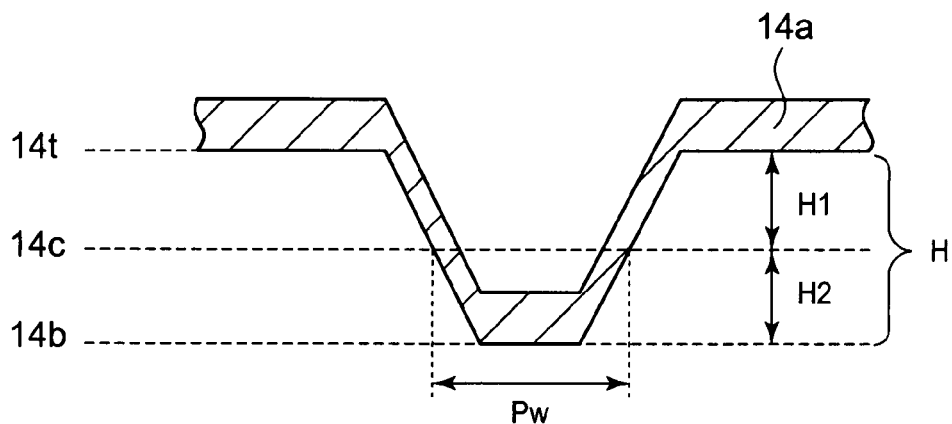
FIG. 9 is an illustration of one of the surfaces of a second substrate on which the third recording layer is formed in compliance with the BD-ROM specifications in the optical disc according to the present invention.
FIG. 10 is a view showing a table for use in evaluation of the pit depth of the third recording layer in the optical disc according to the present invention.

Illustrated in FIG. 9 is one of the surfaces of the second substrate 15 on which the third recording layer 14 is formed in compliance with the BD-ROM specifications.

In FIG. 9, a pit depth H is a depth or a height from a top section 14t to a bottom section 14b of each pit of a string of the third data pits. The pit width Pw is given at H1=H2 (H1+H2=H) in which H1 and H2 are the depth from the top section 14t to a middle section 14c and from the middle section 14c to the bottom section 14b, respectively.

The tables in FIGS. 7 and 8 teach that the reflectivity varies little against change in the pit width Pw. In contrast, jitter on signals reproduced from the third recording layer 14 varies very much with change in the pit width Pw.

In detail, in FIGS. 7 and 8, the samples having the third semi-transparent reflective film 14a with the thickness of 5 or 20 nm and the pit width Pw for 8T pits in the range from 0.12 to 0.2 μm satisfy the standard reflectivity range requirements for the dual-layer BD and DVD, and also jitter range requirements for the dual-layer BD.

Discussed next with reference to FIGS. 10 to 13 are the disc characteristics in the sample optical discs having the third semi-transparent reflective film 14a of specific thicknesses, with specific constant pit width Pw but variation in pit depth H for the third recording layer 14 in the BD composite layer.

The thickness of the third semi-transparent reflective film 14a and the pit width Pw in the third recording layer 14 are 5 nm and 0.2 μm, 5 nm and 0.12 μm, 20 nm and 0.12 μm, and 20 nm and 0.2 μm in FIGS. 10 to 13, respectively.

The tables in FIGS. 10 to 13 teach that the reflectivity varies little against change in the pit depth H. In contrast, jitter on signals reproduced from the third recording layer 14 varies with change in the pit depth H. Thus, there is an optimum range for the pit depth H.

In detail, in FIGS. 10 to 13, the samples having the third recording layer 14 with the pit depth H in the range from 40 to 85 nm satisfy the standard reflectivity range requirements for the dual-layer BD and DVD and also jitter range requirements for the dual-layer BD. A more preferable range for the pit depth H is from 50 to 85 nm.

As discussed above, in the optical disc D of the embodiment according to the present invention, the thickness range from 5 to 20 nm for the third semi-transparent reflective film 14a satisfies both the standard reflectivity range requirements for the dual-layer BD and also the dual-layer DVD.

In other words, the third semi-transparent reflective film 14a with the thickness range from 5 to 20 nm reflects the second laser beam L2 having a BD-ROM specification wavelength, whereas it allows the first laser beam L1 having a DVD-ROM specification wavelength to pass therethrough. Moreover, jitter on signals reproduced from the third recording layer 14 are at or below 6.5%, the standard maximum jitter level for the dual-layer BD, under the thickness range defined above for the reflective film 14a.

Furthermore, under the evaluation, one requirement for the optical disc D in the embodiment of the present invention for further excellent disc characteristics is the pit width Pw in the range 0.12 to 0.2 μm for the 8T pits among those in a string of the third data pits formed on the third recording layer 14 of the second substrate 15, in compliance with the BD-ROM specifications.

Another requirement for the optical disc D in the embodiment of the present invention for further excellent disc characteristics is the pit depth H in the range from 40 to 85 nm for the pits in a string of the third data pits formed as the third recording layer 14 of the second substrate 15, in compliance with the BD-ROM specifications.

Evaluated next is the disc characteristics of the film thickness Tf of the first reflective film 11a formed on the first recording layer 11 of the first substrate 12 and also the pit width Pw of the first data pits of the recording layer 11 in the optical disc D according to the present invention.

Several sample optical discs were produced according to the present invention with the first reflective film 11a made of a material having Al as a main ingredient with the pit width Pw of the first data pits of 300 nm (0.30 μm), a standard pit width in the DVD-ROM specifications.

The pit width Pw of the first data pits is the width for each of 14T (reference clock cycle) pits defined with the half-value breadth, such as, illustrated in FIG. 9. In FIG. 9, the pit width Pw is given at the middle section 14c or one-half of the depth (height) from the top section 14t to the bottom section 14b in the thickness direction of the first substrate 12, in which a depth (distance) from the top section to the middle section and another depth (distance) from the middle section to the bottom section are equal to each other.

The evaluation is shown in FIG. 14 in which DVD-L1 LAYER denotes the first reflective film 11a, which will also be applied to FIGS. 15 to 19. FIG. 14 teaches that the sample optical discs with the first reflective film 11a having the film thickness Tf in the range from 30 nm to 120 nm meet (GOOD) the dual-layer-DVD reflectivity requirement.

Evaluated next are the reflectivity and jitter at the first reflective film 11a to the pit width Pw of the first data pits (14T pits) at a particular film thickness Tf of the reflective film 11a selected among those (FIG. 14) at which the sample optical discs meet the reflectivity requirement.

The evaluation shown in FIGS. 15 to 19 in which GOOD is given to the sample optical discs that meet the dual-layer-DVD reflectivity requirement in the range from 18% to 30% and also the DVD jitter requirement of 8.0% or smaller, whereas NG is given to those that do not meet either the dual-layer-DVD reflectivity requirement or the jitter requirement.

FIG. 15 shows the evaluation at a 30 nm film thickness Tf of the first reflective film 11a which gives the smallest reflectivity among the thicknesses Tf listed in FIG. 14, given the result of GOOD.

FIG. 15 teaches that the sample optical discs with the first reflective film 11a having the 30 nm film thickness Tf meets both of the dual-layer-DVD reflectivity requirements and the DVD jitter requirement at the pit width Pw in the range from 180 nm to 420 nm with Pw/Tf in the range from 6.0 to 14.0.

FIG. 16 shows the evaluation in the same way as in FIG. 15 but at a 120 nm film thickness Tf of the first reflective film 11a which gives the largest reflectivity among the thicknesses Tf listed in FIG. 14, given the result of GOOD.

FIG. 16 teaches that the sample optical discs with the first reflective film 11a having the 120 nm film thickness Tf meets both of the dual-layer-DVD reflectivity requirements and the DVD jitter requirement at the pit width Pw in the range from 300 nm to 500 nm with Pw/Tf in the range from 2.5 to 4.17.

FIG. 17 shows the evaluation in the same way as in FIG. 15 but at a 50 nm film thickness Tf of the first reflective film 11a. FIG. 17 teaches that the sample optical discs with the reflective film 11a at the 50 nm thickness Tf meets both of the dual-layer-DVD reflectivity requirements and the DVD jitter requirement at the pit width Pw in the range from 180 nm to 500 nm with Pw/Tf in the range from 3.6 to 10.0.

FIG. 18 shows the evaluation in the same way as in FIG. 15 but at a 75 nm film thickness Tf of the first reflective film 11a. FIG. 18 teaches that the sample optical discs with the reflective film 11a having the 75 nm thickness Tf meets both of the dual-layer-DVD reflectivity requirements and the DVD jitter requirement at the pit width Pw in the range from 200 nm to 500 nm with Pw/Tf in the range from 2.67 to 6.67.

FIG. 19 shows the evaluation in the same way as in FIG. 15 but at a 100 nm film thickness Tf of the first reflective film 11a. FIG. 19 teaches that the sample optical discs with the reflective film 11a having the 100 nm thickness Tf meets both of the dual-layer-DVD reflectivity requirements and the DVD jitter requirement at the pit width Pw in the range from 260 nm to 500 nm with Pw/Tf in the range from 2.6 to 5.0.

FIGS. 15 to 19 teach that jitter depends on the pit width Pw even if the film thickness Tf is constant for the first reflective film 11a. In other words, a wider pit width Pw at a thicker film thickness Tf in Pw/Tf gives a sufficient pit width Pw and also a sufficient pit depth H (FIG. 9), resulting in allowable jitter in the DVD-ROM jitter requirement. In contrast, a narrower width Pw at a thicker thickness Tf causes that the pits are filled with reflective film 11a. A narrower width Pw thus gives thickness limitation on the reflective film 11a. Moreover, a wider width Pw at a thinner thickness Tf cause larger jitter due to crosstalk between adjacent tracks.

Accordingly, the pit width Pw on the first recording layer 11 and the film thickness Tf of the first reflective film 11a are required to fall in a specific range in Pw/Tf for allowable jitter, that is $2.5 \leq Pw/Tf \leq 14$ according to the results shown in FIGS. 15 to 19, for the optical disc D.

Figure 20:
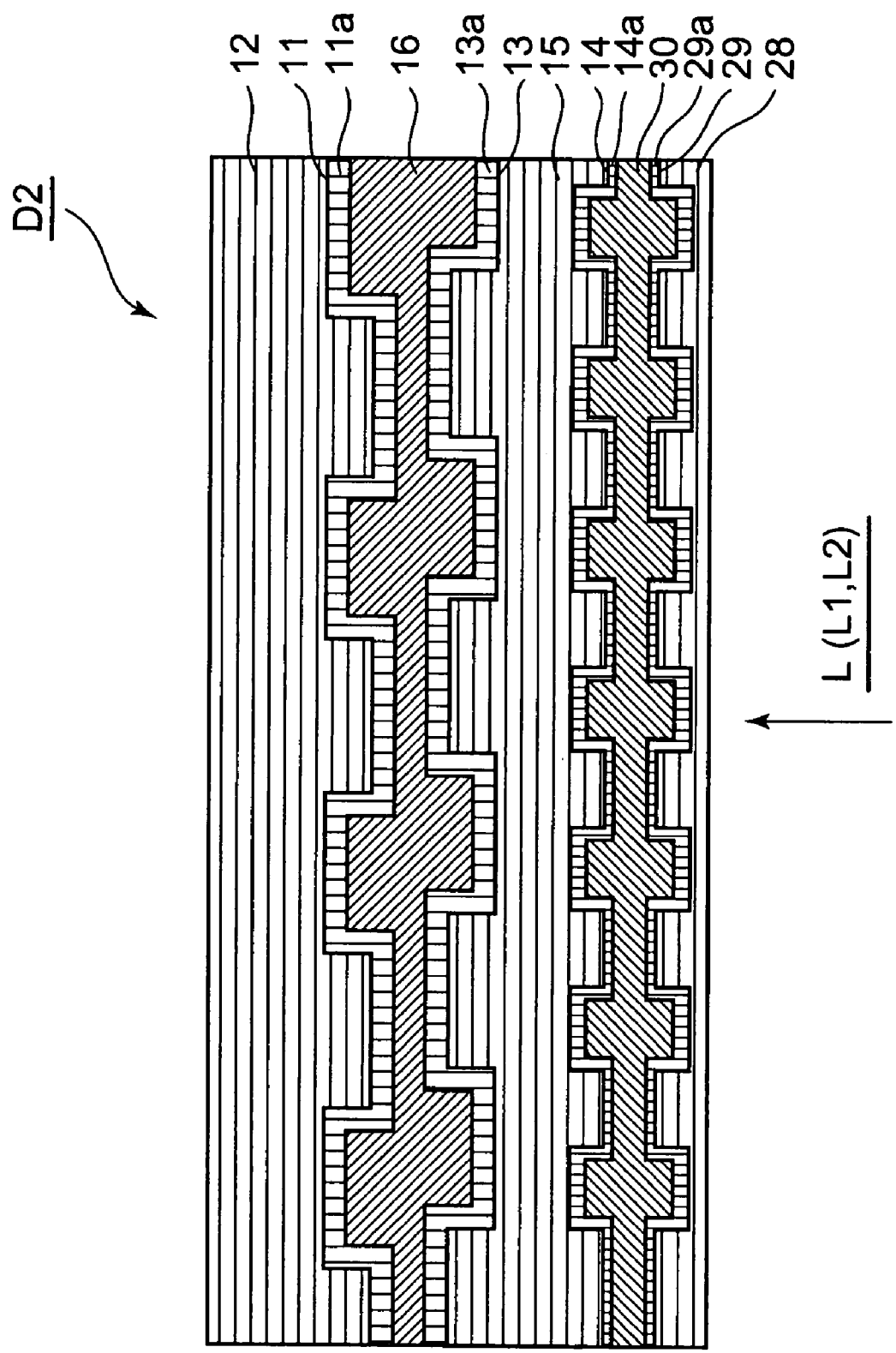
FIG. 20 is a sectional view showing another preferred embodiment of an optical disc according to the present invention.

Another preferred embodiment of an optical disc according to the present invention will be disclosed with reference to FIG. 20. The same reference numerals are given to the components identical to those shown in FIG. 4, the explanation thereof being omitted.

An optical disc D2 shown in FIG. 20 includes two recording layers in compliance with the DVD-ROM specifications and also two recording layers in compliance with the BD-ROM specifications.

Provided between a transparent cover layer 28 and a second reflective film 14a are a fourth recording layer 29 and a fourth reflective film 29a formed on the recording layer 29. The recording layer 29 has a string of fourth data pits in compliance with the BD-ROM specifications.

The optical disc D2 is required to meet at least the dual-layer BD and DVD reflectivity requirements.

The recording layer in compliance with the BD-ROM specifications can be formed with the 2P method already described, thermal transfer with a thermoplastic resin film, or using a UV-cured film.

Described below is the manner in which to form a recording layer in compliance with the BD-ROM specifications by thermal transfer with a thermoplastic resin film.

A metal stamper, such as the stamper 26 shown in FIG. 5F, is pressed onto a thermoplastic resin film of polycarbonate, for example, having a thickness of 75 μm±3 μm. The metal stamper 26 made of Ni, for example, has a concave and convex pattern in compliance with the BD-ROM specifications, heated to a high temperature at or over the resin glass transition temperature.

The metal stamper 26 is then peeled off from the thermally deformed thermoplastic resin film. The thermally deformed film becomes a film (28) having the fourth recording layer 29 with the string of fourth data pits in compliance with the BD-ROM specifications. The fourth data pits carry data in compliance with the BD-ROM specifications. The film 28 is the transparent cover layer 28 that allows a laser beam L to pass therethrough in reproduction.

Formed on the recording layer 29 is a reflective film 29a made of a material the same as that for the reflective films already described. The reflective films 29a and 14a are bonded to each other via an adhesive layer 30 of about 25 μm in thickness, with a technique such as spin coating.

Described next is the manner in which to form the fourth recording layer having a string of fourth data pits in compliance with the BD-ROM specifications, using a UV-cured film, between a transparent cover layer and the reflective film 14a.

A UV-cured film is attached to the reflective film 14a of the second substrate 15. The UV-cured film is 25 μm in thickness with UV-cured resin applied on both sides. The fourth recording layer is then formed on the UV-cured film with a soft stamper having a concave and convex pattern in compliance with the BD-ROM specifications. A fourth reflective film made of a material the same as that for the reflective films already described is then formed on the fourth recording layer, followed by a transparent cover layer with 75 μm±3 μm in thickness on the fourth reflective film.

Although the optical disc produced as described above has a different structure from the optical disc D2 shown in FIG. 20, it exhibits high reproducibility at the fourth recording layer in compliance with the BD-ROM specifications and also at the other recording layers.

FIG. 21 shows the evaluation of several sample discs produced as the optical disc D2 relates the disc characteristics (reflectivity) to the film thickness Tf of the reflective film 11a formed on the recording layer 11 of the first substrate 12 and to the pit width Pw of the first data pits on the recording layer 11.

Several sample optical discs were produced as the optical disc D2 with the first reflective film 11a made of a material having Al as a main ingredient with the pit width Pw of the first data pits of 300 nm (0.30 μm), a standard pit width in the DVD-ROM specifications.

The pit width Pw of the first data pits is the width for each 14T pit defined with the half-value breadth, such as, illustrated in FIG. 9.

In the evaluation shown in FIG. 21, DVD-L1 LAYER denotes the first reflective film 11a, which will also be applied to FIGS. 22 to 26. FIG. 21 teaches that the sample optical discs with the first reflective film 11a having the film thickness Tf in the range from 35 nm to 130 nm meet (GOOD) the dual-layer-DVD reflectivity requirement.

Evaluated next are the reflectivity and jitter at the first reflective film 11a to the pit width Pw of the first data pits (14T pits) at a particular film thickness Tf of the reflective film 11a selected among those (FIG. 21) at which the sample optical discs meet the reflectivity requirement.

The evaluation is shown in FIGS. 22 to 26 in which GOOD is given to the sample optical discs that meet the dual-layer-DVD reflectivity requirement in the range from 18% to 30% and also the DVD jitter requirement of 8.0% or smaller, whereas NG is given to those that do not meet either the dual-layer-DVD reflectivity requirement or the jitter requirement.

FIG. 22 shows the evaluation at a 35 nm film thickness Tf of the first reflective film 11a which gives the smallest reflectivity among the thicknesses Tf listed in FIG. 21, given the result of GOOD.

FIG. 22 teaches that the sample optical discs with the first reflective film 11a having the 35 nm film thickness Tf meets both of the dual-layer-DVD reflectivity requirements and the DVD jitter requirement at the pit width Pw in the range from 180 nm to 420 nm with Pw/Tf in the range from 5.14 to 12.0.

FIG. 23 shows the evaluation in the same way as in FIG. 22 but at a 130 nm film thickness Tf of the first reflective film 11a which gives the largest reflectivity among the thicknesses Tf listed in FIG. 21, given the result of GOOD.

FIG. 23 teaches that the sample optical discs with the first reflective film 11a having the 130 nm film thickness Tf that meets both of the dual-layer-DVD reflectivity requirements and the DVD jitter requirement at the pit width Pw in the range from 340 nm to 500 nm with Pw/Tf in the range from 2.61 to 3.85.

FIG. 24 shows the evaluation in the same way as in FIG. 22 but at a 55 nm film thickness Tf of the first reflective film 11a. FIG. 24 teaches that the sample optical discs with the reflective film 11a having the 55 nm thickness Tf meets both of the dual-layer-DVD reflectivity requirements and the DVD jitter requirement at the pit width Pw in the range from 180 nm to 500 nm with Pw/If in the range from 3.27 to 9.09.

FIG. 25 shows the evaluation in the same way as in FIG. 22 but at an 80 nm film thickness Tf of the first reflective film 11a. FIG. 25 teaches that the sample optical discs with the reflective film 11a having the 80 nm thickness Tf meets both of the dual-layer-DVD reflectivity requirements and the DVD jitter requirement at the pit width Pw in the range from 220 nm to 500 nm with Pw/Tf in the range from 2.75 to 6.25.

FIG. 26 shows the evaluation in the same was as in FIG. 22 but at a 110 nm film thickness Tf of the first reflective film 11a. FIG. 26 teaches that the sample optical discs with the reflective film 11a having the 110 nm thickness Tf meets both of the dual-layer-DVD reflectivity requirements and the DVD jitter requirement at the pit width Pw in the range from 300 nm to 500 nm with Pw/Tf in the range from 2.73 to 4.55.

Accordingly, the pit width Pw on the first recording layer 11 and the film thickness Tf of the first reflective film 11a are required to fall in a specific range in Pw/Tf for allowable jitters, that is $2.7 \leq Pw/Tf \leq 12$ according to the results shown in FIGS. 22 to 26, for the optical disc D2.

Discussed next is the evaluation of the disc characteristics of an optical disc D3 having the same layer structure as that shown in FIG. 1 but produced as disclosed above according to the present invention. The same reference numerals are given to the optical disc D3 for the corresponding layers and films to those of shown in FIG. 1.

Figure 1:
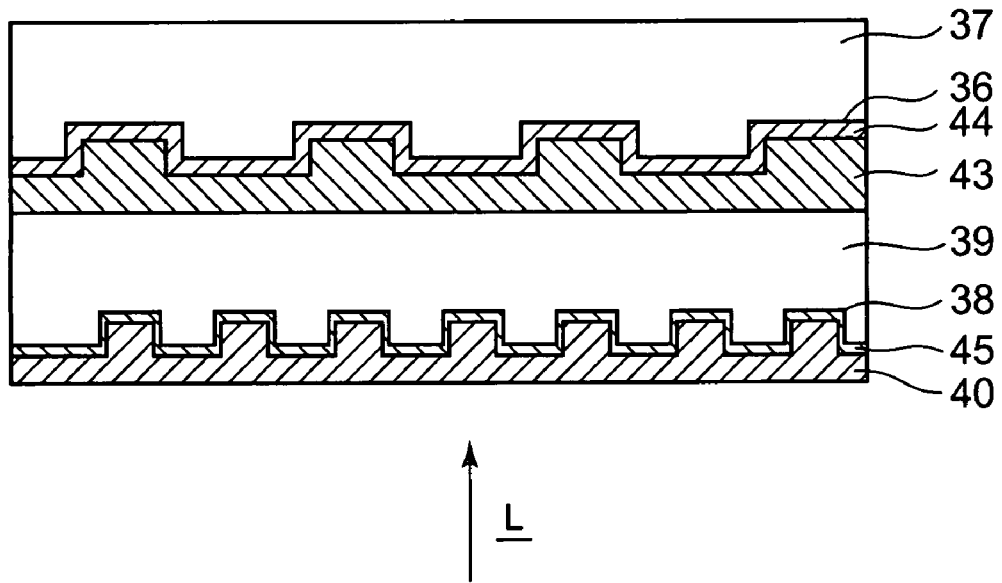
FIG. 1 is a sectional view showing a known optical disc having a DVD-recording layer and a BD-recording layer.
Figure 2:
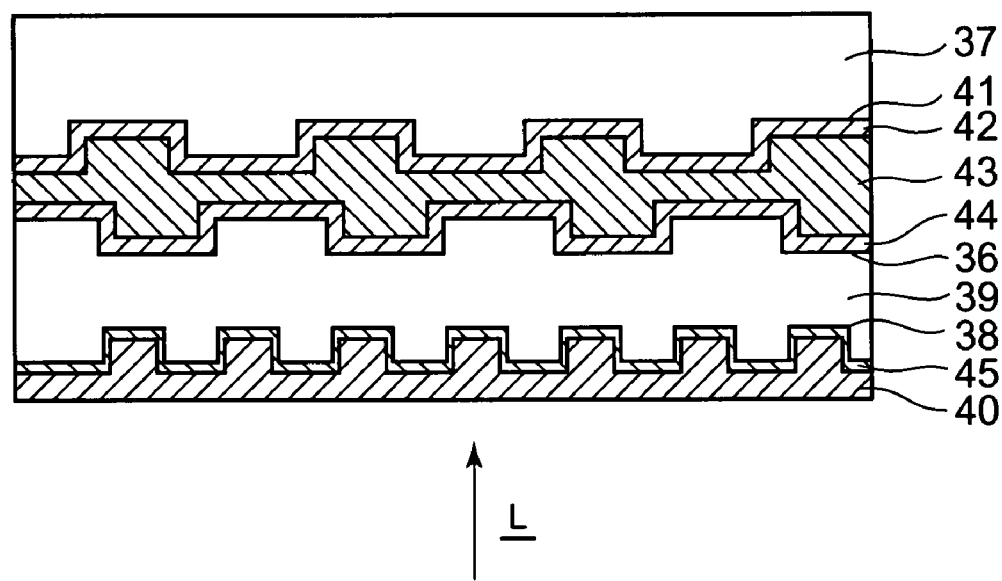
FIG. 2 is a sectional view showing a known optical disc having two DVD-recording layers and a single BD-recording layer.
Figure 3:
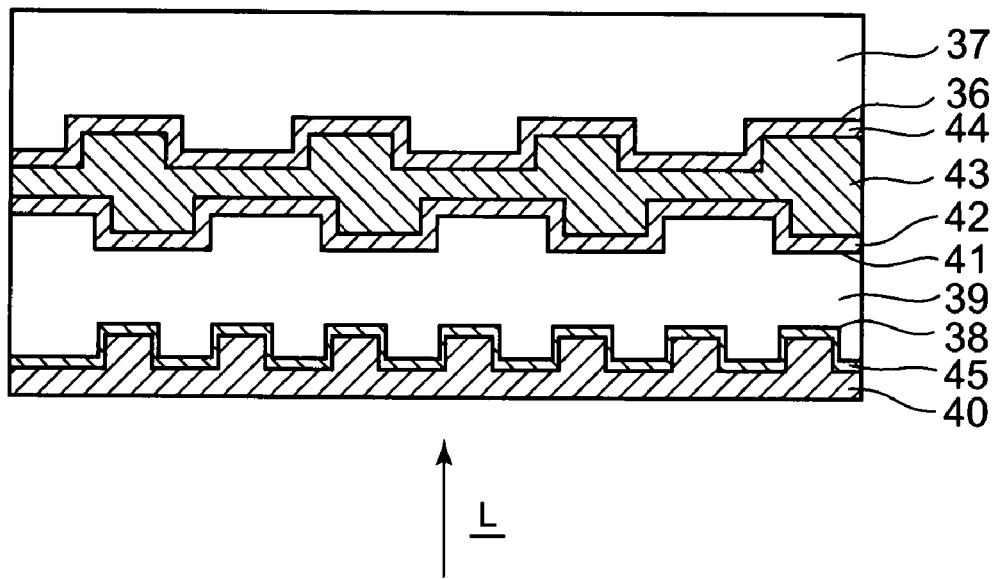
FIG. 3 is a sectional view showing another known optical disc having two DVD-recording layers and a single BD-recording layer.

Like shown in FIG. 1, the optical disc D3 according to the present invention has a first recording layer 36 in compliance with the DVD-ROM specifications and a second recording layer 38 in compliance with the BD-ROM specifications.

The first recording layer 36 is provided on a first substrate 37 with a first reflective film 44, which are formed in the same way as the counterparts 11, 12 and 11a, respectively, shown in FIG. 4.

The second recording layer 38 is provided on a 0.5-mm-thick second substrate 39 with a second reflective film 45 and a transparent cover layer 40, which are formed in the same way as the counterparts 14, 15, 14a and 17, respectively, shown in FIG. 4.

Several sample optical discs were produced according to the present invention with the first reflective film 44 made of a material having Al as a main ingredient with the pit width Pw of a string of first data pits of 300 nm (0.30 µm), a standard pit width in the DVD-ROM specifications.

Evaluated are the disc characteristics (reflectivity) of the film thickness Tf of the first reflective film 44 formed on the first recording layer 36 of the first substrate 37 and also the pit width Pw of first data pits of the recording layer 36 in the optical disc D3 according to the present invention.

The evaluation is shown in FIG. 27 in which DVD LAYER denotes the first reflective film 44, which will also be applied to FIGS. 28 to 32. FIG. 27 teaches that the sample optical discs with the reflective film 44 having the film thickness Tf in the range from 35 nm to 140 nm meet (GOOD) the single-layer-DVD reflectivity requirement.

Evaluated next are the reflectivity and jitter at the first reflective film 44 to the pit width Pw of the first data pits (14T pits) at a particular film thickness Tf of the first reflective film 44 selected among those (FIG. 27) at which the sample optical discs meet the reflectivity requirement.

The evaluation is shown in FIGS. 28 to 32 in which GOOD is given to the sample optical discs that meet the single-layer-DVD reflectivity requirement in the range from 45% to 85% and also the DVD-ROM jitter requirement of 8.0% or smaller, whereas NG is given to those that do not meet either the single-layer-DVD reflectivity requirement or the jitter requirement.

FIG. 28 shows the evaluation at a 35 nm film thickness Tf of the reflective film 44 which gives the smallest reflectivity among the thicknesses Tf listed in FIG. 27, given the result of GOOD.

FIG. 28 teaches that the sample optical discs with the reflective film 44 having the 35 nm film thickness Tf meets both of the single-layer-DVD reflectivity requirements and the DVD jitter requirement at the pit width Pw in the range from 180 nm to 460 nm with Pw/Tf in the range from 5.14 to 13.14.

FIG. 29 shows the evaluation in the same way as in FIG. 28 but at a 140 nm film thickness Tf of the reflective film 44 which gives the largest reflectivity among the thicknesses Tf listed in FIG. 27, given the result of GOOD.

FIG. 29 teaches that the sample optical discs with the reflective film 44 having the 140 nm film thickness Tf meets both of the single-layer-DVD reflectivity requirements and the DVD jitter requirement at the pit width Pw in the range from 320 nm to 500 nm with Pw/Tf in the range from 2.29 to 3.57.

FIG. 30 shows the evaluation in the same way as in FIG. 28 but at a 65 nm film thickness Tf of the reflective film 44. FIG. 30 teaches that the sample optical discs with the reflective film 44 having the 65 nm thickness Tf meets both of the single-layer-DVD reflectivity requirements and the DVD jitter requirement at the pit width Pw in the range from 180 nm to 500 nm with Pw/Tf in the range from 2.77 to 7.69.

FIG. 31 shows the evaluation in the same way as in FIG. 28 but at a 90 nm film thickness Tf of the reflective film 44. FIG. 31 teaches that the sample optical discs with the reflective film 44 having the 90 nm thickness Tf meets both of the single-layer-DVD reflectivity requirements and the DVD jitter requirement at the pit width Pw in the range from 220 nm to 500 nm with Pw/Tf in the range from 2.44 to 5.56.

FIG. 32 shows the evaluation in the same way as in FIG. 28 but at a 115 nm film thickness Tf of the reflective film 44. FIG. 32 teaches that the sample optical discs with the reflective film 44 having the 115 nm thickness Tf meets both of the single-layer-DVD reflectivity requirements and the DVD jitter requirement at the pit width Pw in the range from 260 nm to 500 nm with Pw/Tf in the range from 2.26 to 4.35.

Accordingly, the pit width Pw on the recording layer 36 and the film thickness Tf of the reflective film 44 are required to fall in a specific range in Pw/Tf for allowable jitter, that is $2.3 \leq Pw/Tf \leq 13$ according to the results shown in FIGS. 28 to 32, for the optical disc D3.

As disclosed above in detail, the present invention provides an optical disc having recording layers in compliance with the DVD-ROM specifications and a recording layer in compliance with the BD-ROM specifications, that satisfies the reflectivity range requirements in both DVD- and BD-ROM specifications.

The optical disc according to the present invention is thus reproducible by both DVD and BD players with high video quality. Therefore, disc manufacturers need not produce both DVD and BD for each type of video content, such as movies, which contributes to the savings of resources and energy, while boosting convenience for customers or users.

What is claimed is:

1. An optical disc comprising:
   a first substrate having a thickness of 0.6 mm±30 µm, with a first recording layer formed thereon, the first recording layer having a string of first data pits formed concentrically or spirally in compliance with DVD-ROM specifications, the first data pits including 14T pits, T being a reference clock cycle;
   a first reflective film formed on the first recording layer, the first reflective film having a thickness in the range from 30 nm to 140 nm, the first substrate and the first reflective film having a relationship of $2.3 \leq Pw/Tf \leq 14$ wherein Pw is a pit width of each 14T pit at a middle section of the 14T pit and Tf is a thickness of the first reflective film, the middle section being located between a top section and a bottom section of the 4T pit in a thickness direction of the first substrate, a distance from the top section to the middle section and another distance from the middle section to the bottom section being equal to each other;
   a second substrate having a thickness of 0.5 mm±30 µm and having a first surface and an opposing second surface, with a second recording layer formed on the first surface, the second recording layer having a string of second data pits formed concentrically or spirally in compliance with BD-ROM specifications;
   a second semi-transparent reflective film formed on the second recording layer, the first and second substrates being bonded to each other so that the first reflective film and the second surface of the second substrate face each other; and
   a transparent layer having a third surface and an opposing fourth surface, the transparent layer being formed over the second reflective film at the third surface, the fourth surface allowing a laser beam to pass therethrough in reproduction from at least either the first or the second data pits.

2. The optical disc according to claim 1, wherein the second reflective film has a thickness in the range from 5 nm to 20 nm.

3. The optical disc according to claim 1, wherein the transparent layer has a thickness of 100 µm±3 µm.

4. The optical disc according to claim 1 further comprising a third recording layer in compliance with the BD-ROM specifications and a third reflective film formed on the third recording layer, the third recording layer and the third reflective film being provided between the second reflective film and the transparent layer, the transparent layer having a thickness of 75 µm±3 µm.

5. The optical disc according to claim 1, wherein the second data pits include 8T pits, a pit width of each 8T pit being in the range from 0.12 μm to 0.2 μm at a middle section of the 8T pit, the middle section being located between a top section and a bottom section of the 8T pit in a thickness direction of the second substrate, a distance from the top section to the middle section and another distance from the middle section to the bottom section being equal to each other.

6. The optical disc according to claim 1, wherein a depth of each second data pit is in the range from 40 nm to 85 nm in a thickness direction of the second substrate.

7. The optical disc according to claim 1 further comprising a fourth recording layer having a string of fourth data pits formed on the second surface of the second substrate concentrically or spirally in compliance with the DVD-ROM specifications.

8. A method of producing an optical disc comprising the steps of:
  forming a first recording layer on a first substrate having a thickness of 0.6 mm±30 μm, so that the first recording layer has a string of first data pits formed concentrically or spirally in compliance with DVD-ROM specifications, the first data pits including 14T pits, T being a reference clock cycle;
  forming a first reflective film on the first recording layer, so that the first reflective film has a thickness in the range from 30 nm to 140 nm and has a relationship of $2.3 \leq Pw/Tf \leq 14$ with the first reflective film, wherein Pw is a pit width of each 14T pit at a middle section of the 14T pit and Tf is a thickness of the first reflective film, the middle section being located between a top section and a bottom section of the 14T pit in a thickness direction of the first substrate, a distance from the top section to the middle section and another distance from the middle section to the bottom section being equal to each other;
  forming a second recording layer on a second substrate having a thickness of 0.5 mm±30 μm and having a first surface and an opposing second surface, so that the second recording layer has a string of second data pits formed on the first surface concentrically or spirally in compliance with BD-ROM specifications;
  forming a second semi-transparent reflective film on the second recording layer;
  forming a transparent layer, having a third surface and an opposing fourth surface, over the second reflective film at the third surface, the fourth surface allowing a laser beam to pass therethrough in reproduction from at least either the first or the second data pits; and
  bonding the first and second substrates to each other so that the first reflective film and the second surface of the second substrate face each other.

9. The method according to claim 8, wherein the step of forming the second reflective film includes the step of forming the second reflective film as having a thickness in the range from 5 nm to 20 nm on the second substrate.

10. The method according to claim 8, wherein the step of forming the transparent layer includes the step of forming the transparent layer as having a thickness of 100 μm±3 μm over the second reflective film.

11. The method according to claim 8 further comprising the steps of:
  providing a third recording layer in compliance with the BD-ROM specifications and a third reflective film both between the second reflective film and the transparent layer;
  forming the third reflective film on the third recording layer; and
  forming the transparent layer as having a thickness of 75 μm±3 μm.

12. The method according to claim 8, wherein the step of forming the transparent layer includes the step of forming the second data pits as including 8T pits, a pit width of each 8T pit being in the range from 0.12 μm to 0.2 μm at a middle section of the 8T pit, the middle section being provided between a top section and a bottom section of the 8T pit in a thickness direction of the second substrate, a distance from the top section to the middle section and another distance from the middle section to the bottom section being equal to each other.

13. The method according to claim 8, wherein the step of forming the second recording layer includes the step of forming the second data pits so that a depth of each second data pits is in the range from 40 nm to 85 nm in a thickness direction of the second substrate.

14. The method according to claim 8 further comprising the step of forming a fourth recording layer having a string of fourth data pits on the second surface of the second substrate concentrically or spirally in compliance with the DVD-ROM specifications.

* * * * *